(12) United States Patent
Ogino

(10) Patent No.: US 11,774,839 B2
(45) Date of Patent: Oct. 3, 2023

(54) LIGHT SOURCE APPARATUS AND PROJECTOR

(71) Applicant: CASIO COMPUTER CO., LTD., Tokyo (JP)

(72) Inventor: Hiroshi Ogino, Higashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/943,730

(22) Filed: Sep. 13, 2022

(65) Prior Publication Data

US 2023/0081683 A1  Mar. 16, 2023

(30) Foreign Application Priority Data

Sep. 14, 2021  (JP) .................. 2021-149569

(51) Int. Cl.
*G03B 21/20*  (2006.01)
*G02B 26/00*  (2006.01)
*G02B 26/08*  (2006.01)

(52) U.S. Cl.
CPC .......... *G03B 21/204* (2013.01); *G02B 26/008* (2013.01); *G02B 26/08* (2013.01); *G02B 26/0808* (2013.01); *G02B 26/0816* (2013.01); *G02B 26/0875* (2013.01); *G03B 21/208* (2013.01)

(58) Field of Classification Search
CPC .. G02B 26/08; G02B 26/008; G02B 26/0808; G02B 26/0816; G02B 26/0875; G03B 21/204; G03B 21/208
See application file for complete search history.

(56) References Cited

U.S. PATENT DOCUMENTS

2014/0192328 A1* 7/2014 Lin .................. F21V 13/14
                                                353/7
2019/0250492 A1* 8/2019 Kashihara ............ G02B 26/008

FOREIGN PATENT DOCUMENTS

| JP | 2014110109 A | 6/2014 |
| JP | 2015022249 A | 2/2015 |
| JP | 2018031823 A | 3/2018 |
| JP | 2019061237 A | 4/2019 |
| JP | 2020160149 A | 10/2020 |

* cited by examiner

*Primary Examiner* — Evan P Dzierzynski
*Assistant Examiner* — Nathaniel J Lee
(74) *Attorney, Agent, or Firm* — Scully, Scott, Murphy & Presser, P.C.

(57) ABSTRACT

A light source apparatus includes an excitation light shining device for emitting excitation light, a rotational wheel device including a rotational wheel including a filter area for transmitting light in a predetermined wavelength range differing from a wavelength range of the excitation light and reflecting the excitation light and a direction-changing transmission area for transmitting the excitation light while changing a direction thereof, and a luminescent light emission device which receives the excitation light reflected on the filter area to thereby emit luminescent light including the light in the predetermined wavelength range towards the filter area, and the rotational wheel device is disposed so that an axis of the excitation light which passes through the direction-changing transmission area and an axis of the luminescent light in the predetermined wavelength range which passes through the filter area are superposed on each other.

20 Claims, 19 Drawing Sheets

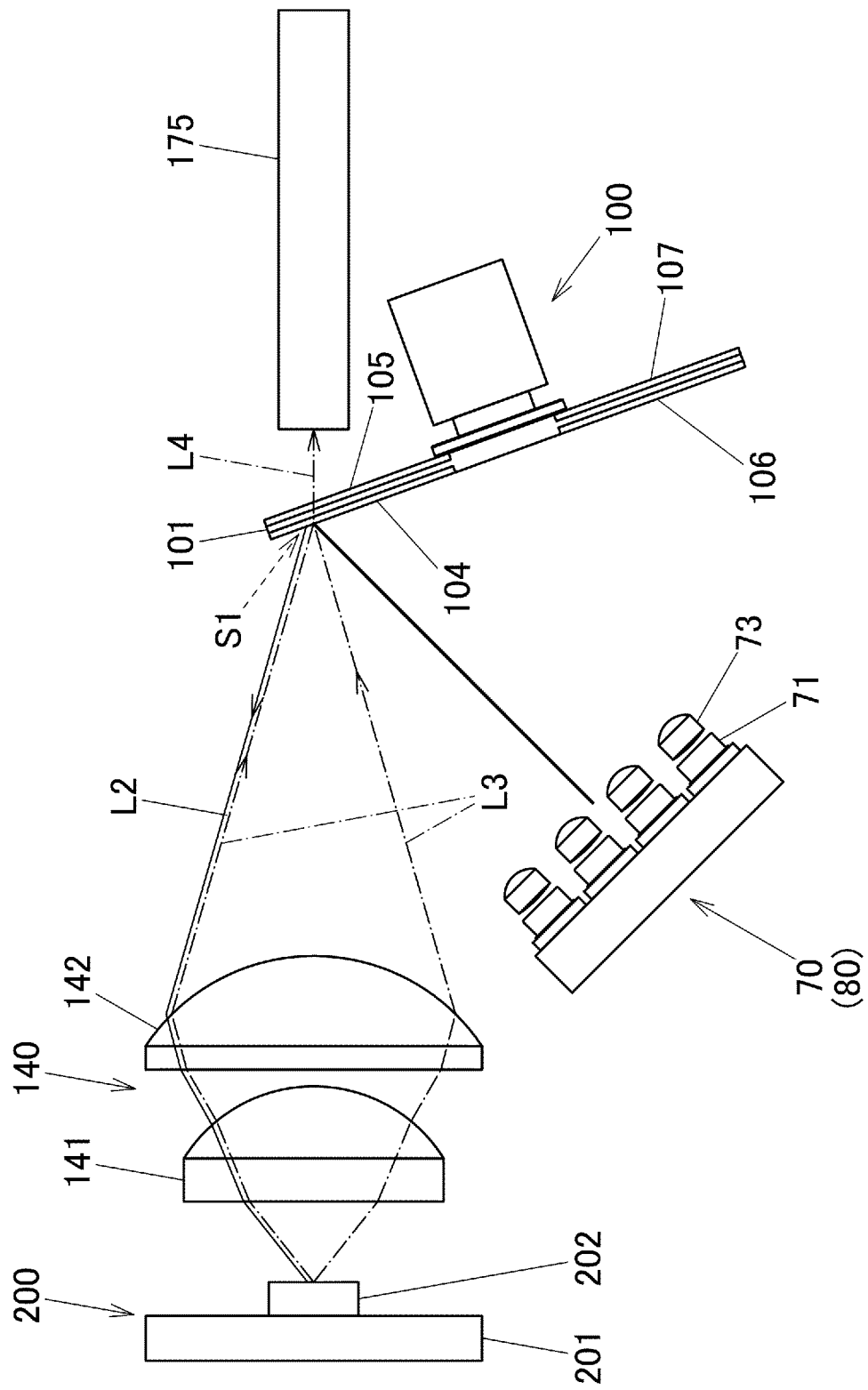

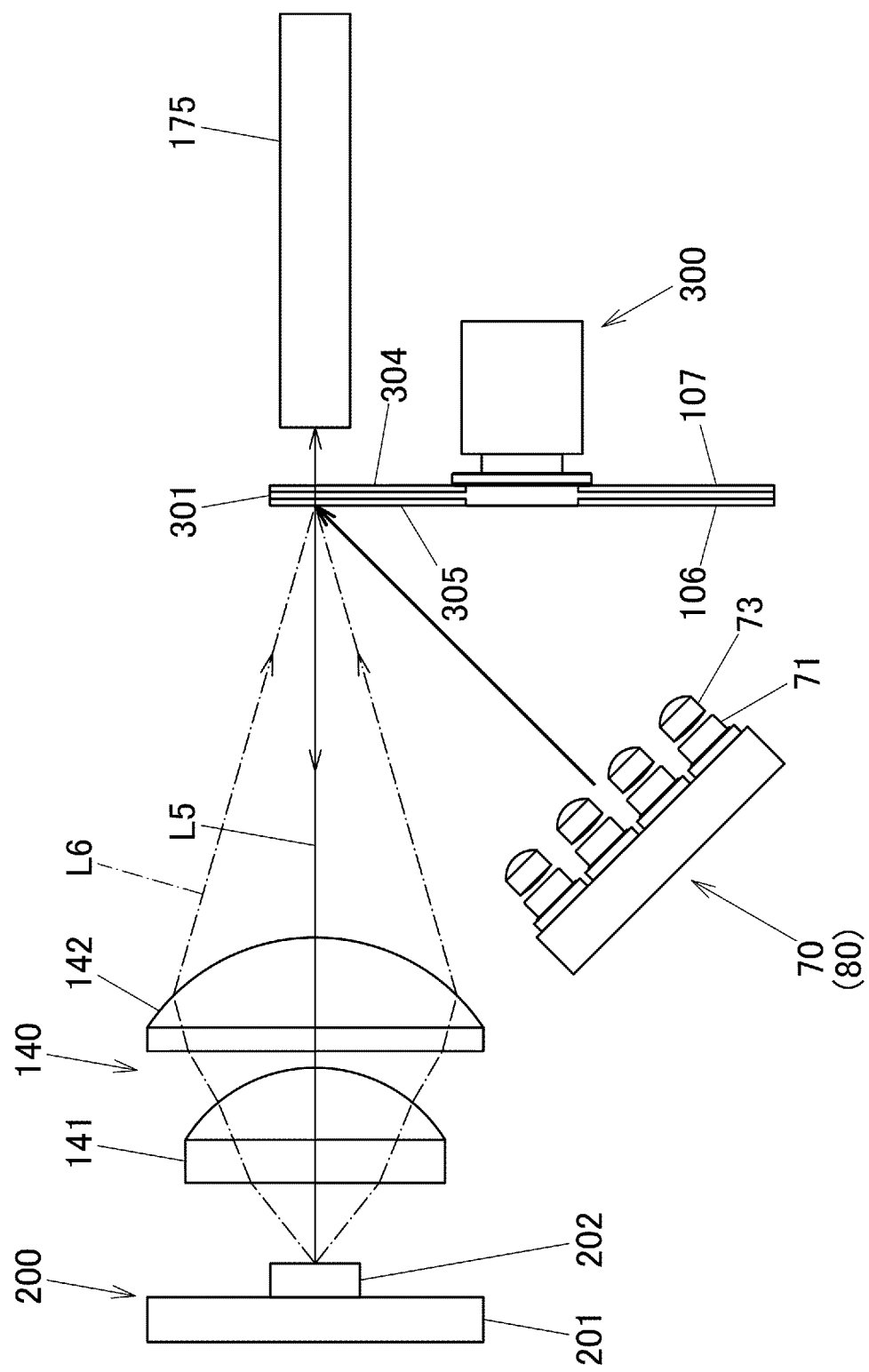

LIGHT SOURCE APPARATUS AND PROJECTOR

CROSS-REFERENCE TO RELATED APPLICATION

This patent application is based upon the benefit of priority under 35 USC 119 from Japanese Patent Application No. 2021-149569 filed on Sep. 14, 2021, the entire disclosure of which, including the specification, claims, drawings and abstract, is incorporated herein by reference in its entirety.

BACKGROUND OF THE INVENTION

Field of the Invention

The present invention relates to a light source apparatus and a projector.

Description of the Related Art

In these days, projectors are in use which project, for example, a screen of a personal computer, a video screen, image data stored in a memory card or the like on to a screen. In these projectors, light emitted from a light source is collected to a micromirror display device called a digital micromirror device (DMD) or a liquid crystal panel to thereby display a color image on the screen.

For example, Japanese Patent Laid-Open No. 2020-160149 (JP-A-2020-160149) discloses a light source apparatus including a light source of light having a wavelength in the blue wavelength range or simply light in the blue wavelength range (light in a first wavelength range), a luminescent wheel, a dichroic mirror, a color wheel, and a processor. The color wheel includes a blue-red transmission area for selecting light having a wavelength in the red wavelength range or simply light in the red wavelength range (light in a second wavelength range) which is synthesized by the dichroic mirror and a part of light on a long wavelength-side of light having a wavelength in the green wavelength range or simply light in the green wavelength range (light in a third wavelength range) as light in a fourth wavelength range, and an all-color transmission area. The processor causes the luminescent wheel and the color wheel to synchronize with each other and causes a synchronizing position of the color wheel to deviate from a synchronizing position of the luminescent wheel.

However, in the configuration of the light source apparatus of JP-A-2020-160149 described above in which the dichroic mirror is separately disposed in addition to the luminescent wheel and the color wheel, there may be a case in which the optical path of excitation light, which is light in the blue wavelength range, forms a separate optical path from the optical path of light in the wavelength range different from the excitation light. As this occurs, the light source apparatus is enlarged in size, and there is a possibility that color shading is caused by an inaccuracy attributed to the formation of the separate optical path.

SUMMARY OF THE INVENTION

To solve the problems described above, according to an aspect of the present disclosure, there is provided a light source apparatus including an excitation light shining device configured to emit excitation light, a rotational wheel device including a rotational wheel including a filter area configured to transmit light in a predetermined wavelength range which differs from a wavelength range of the excitation light and reflect the excitation light and a direction-changing transmission area configured to transmit the excitation light while changing a direction of the excitation light, and a luminescent light emission device configured to receive the excitation light reflected on the filter area to thereby emit luminescent light including the light in the predetermined wavelength range towards the filter area, wherein the rotational wheel device is disposed so as to cause an axis of the excitation light which passes through the direction-changing transmission area and an axis of the luminescent light in the predetermined wavelength range which passes through the filter area to be superposed on each other.

According to another aspect of the present disclosure, there is provided a projector including the light source apparatus described above, a display device configured to generate image light, a projection optical system configured to project the image light emitted from the display device on to a projection target object, and a processor configured to control the light source apparatus and the display device.

BRIEF DESCRIPTION OF THE DRAWINGS

FIG. 7 is a schematic plan view showing how excitation light shined on the rotational wheel device according to the first embodiment is reflected by the rotational wheel device and is then shined on a luminescent light emission area of a luminescent light emission device to thereby emit luminescent light;

FIG. 8 is a schematic plan view showing how excitation light shined on a rotational wheel device according to a second embodiment passes through the rotational wheel device and how the excitation light shined on the rotational wheel device is reflected by the rotational wheel device and is then shined on the luminescent light emission area of the luminescent light emission device to thereby emit luminescent light;

DESCRIPTION OF THE EMBODIMENT

First Embodiment

Figure 1:
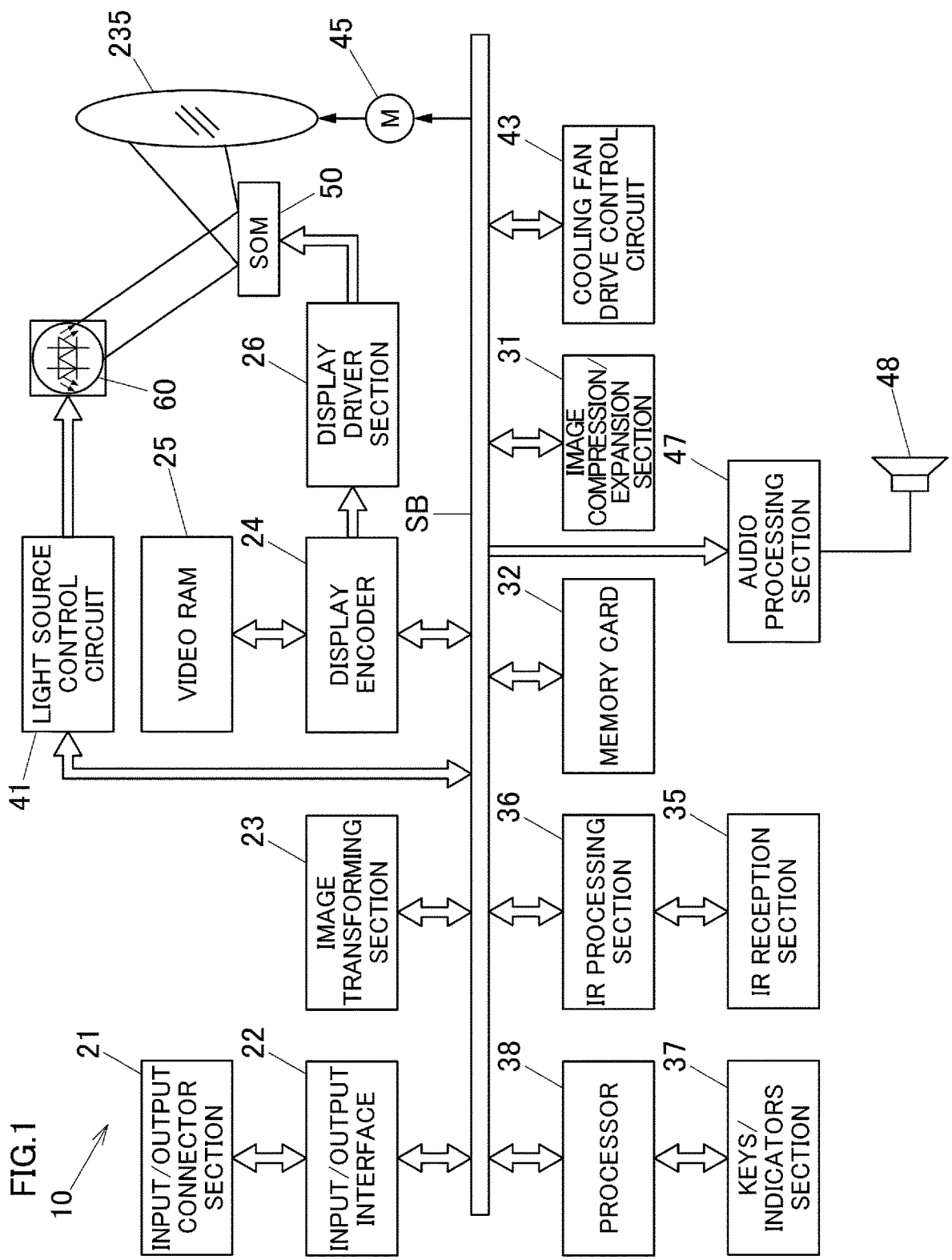
FIG. 1 is a diagram showing functional circuitry blocks of a projector according to a first embodiment.

Hereinafter, referring to FIGS. 1 to 7, an embodiment of the present disclosure will be described. FIG. 1 is a block diagram showing functional circuitry blocks of a projector 10. A projector processor is made up of a central processing unit (CPU) including an image transforming section 23 and a processor 38, a front-end unit including an input/output interface 22, a formatter unit including a display encoder 24 and a display drive section 26, and the like. Image signals of various standards which are input from an input/output connector section 21 are sent to the image transforming section 23 via the input/output interface 22 and a system bus SB, and the image signals so sent are then transformed so as to be unified into an image signal of a predetermined format which is suitable for display in the image transforming section 23. Thereafter, the unified image signal of the predetermined format is output to the display encoder 24.

The display encoder 24 deploys the image signal input thereinto on a video RAM 25 for storage therein and then generates a video signal from the stored contents of the video RAM 25, outputting the video signal so generated to the display drive section 26.

The display drive section 26 drives a display device 50, which is a spatial optical modulator (SOM), at an appropriate frame rate in response to the image signal output from the display encoder 24. In this embodiment, the display device 50 is a digital micromirror device (DMD). The projector 10 is such that light emitted from a light source apparatus 60 is shined on to the display device 50 via a light guiding optical system, whereby an optical image is formed by the light reflected by the display device 50, and the optical image so formed is then projected via a projection optical system 220 (refer to FIG. 2) on to a projection target object such as a screen, not shown, to be displayed on the screen. A movable lens group 235 of the projection optical system 220 can be driven using a lens motor 45 for zooming and focusing.

An image compression/expansion section 31 performs a recording process in which a luminance signal and a color difference signal of the image signal are data compressed through processing such as Adaptive Discrete Cosine Transform (ADCT), Huffman coding, and the like, and the compressed data is sequentially written on a memory card 32, which is a detachable recording medium. Further, with the projector 10 set in a reproducing mode, the image compression/expansion section 31 can read out the image data recorded in the memory card 32 and expands the individual image data that makes up a series of dynamic images frame by frame, outputting the image data so expanded to the display encoder 24 by way of the image transforming section 23. As a result, the image compression/expansion section 31 can output the dynamic images or the like based on the image data stored in the memory card 32.

The processor 38 governs the control of operations of individual circuitries inside the projector 10 and is configured of CPU, a read only memory (ROM) for fixedly storing operation programs such as various settings or the like, RAM used as a work memory, and the like.

A keys/indicators section 37 is made up of main keys and indicators provided on a housing of the projector 10. Operation signals of the keys/indicators section 37 are sent out directly to the processor 38. Key operation signals from a remote controller are received by an IR reception section 35 and are demodulated into code signals in an Ir processing section 36, which are then output to the processor 38.

The processor 38 is connected with an audio processing section 47 by way of the system bus SB. This audio processing section 47 includes a circuitry for a sound source such as a PCM sound source or the like. With the projector 10 set in a projection mode and the reproducing mode, the audio processing section 47 converts audio data into analog signals and drives a speaker 48 so as to output sound or voice loudly therefrom.

In addition, the processor 38 controls a light source control circuit 41. The light source control circuit 41 controls separately operations of an excitation light shining device 70 and a rotational wheel device 100 (refer to FIG. 2) of the light source apparatus 60 so as to enable the light source unit 60 to emit lights in predetermined wavelength ranges which are required in generating an image.

Further, the processor 38 causes a cooling fan drive control circuit 43 to detect temperatures using multiple temperature sensors provided in the light source apparatus 60 and the like, so that the rotation speed of a cooling fan 81 is controlled based on the results of the temperature detections. Additionally, the processor 38 causes the cooling fan drive control circuit 43 to keep the cooling fan 81 rotating using a timer or the like even after a power supply to a main body of the projector 10 is switched off or causes the cooling fan control circuit 43 to switch off the power supply to the main body of the projector 10 depending on the results of the temperature detections.

Figure 2:
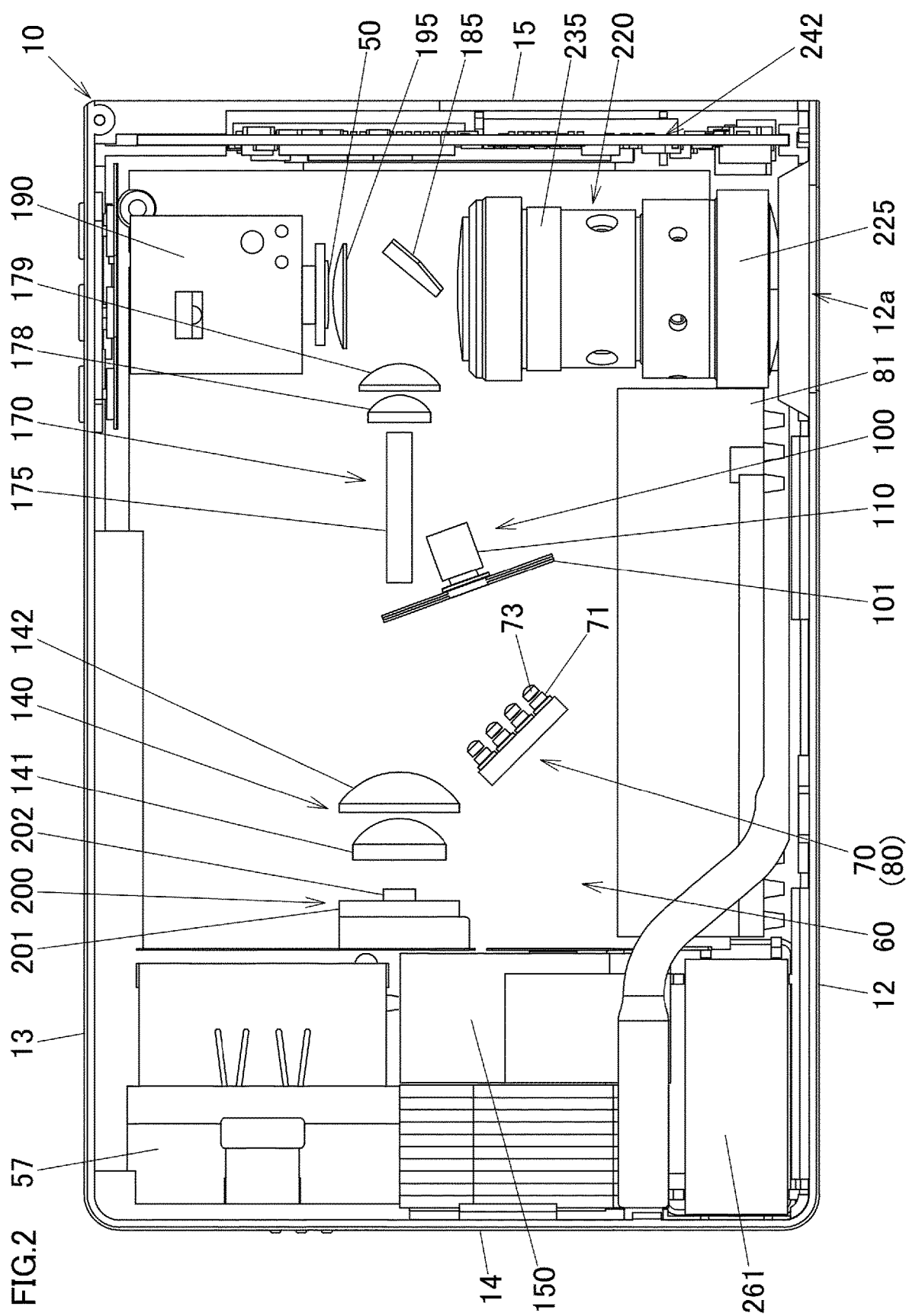
FIG. 2 is a schematic plan view showing an internal structure of the projector according to the first embodiment.

Next, an internal structure of the projector 10 will be described. FIG. 2 is a schematic plan view showing an internal structure of the projector 10. Here, this projector 10 has a substantially box-shaped housing, which includes a front panel 12, a back panel 13, a right panel 14, and a left panel 15 in addition to an upper panel and a lower panel which are not shown. In the following description, when a left-right direction is referred to in relation to the projector 10, it denotes a left-right direction with respect to a projecting direction from a projection port 12a, whereas when a front-rear direction is referred to in relation to the projector 10, it denotes a front-rear direction with respect to a direction from the projector 10 towards a projection target object and a traveling direction of light.

The projector 10 includes a control circuit board 242 disposed in the vicinity of the left panel 15. This control circuit board 242 includes a power supply circuit block, a light source control block, and the like. Additionally, the projector 10 includes the light source apparatus 60, which is disposed substantially at a central portion of the housing of the projector 10, a light source optical system 170, which is disposed on a left-hand side of the light source apparatus 60, and the projection optical system 220, which is disposed between the light source optical system 170 and the control circuit board 242.

The light source apparatus 60 includes the excitation light shining device 70, which constitutes a light source of light having a wavelength in the blue wavelength range or simply light in the blue wavelength range (light in a first wavelength range) and hence a light source of excitation light, a red-green light source device 80, which constitutes a light source of light having a wavelength in the red wavelength range or simply light in the red wavelength range (light in a third wavelength range) and light having a wavelength in the green wavelength range or simply light in the green wavelength range (light in a fourth wavelength range), the rotational wheel device 100, and a fixed luminescent body 200 (a luminescent light emission device). The red-green light source device 80 is made up of the excitation light shining device 70, the rotational wheel device 100, and the fixed luminescent body 200. Additionally, a light guiding optical system 140 and the light source optical system 170 are disposed in the light source apparatus 60. The light guiding optical system 140 is configured not only to guide excitation light reflected by the rotational wheel device 100 towards the fixed luminescent body 200 but also to guide luminescent light emitted from a luminescent light emission area 202 of the fixed luminescent body 200 towards the rotational wheel device 100. The light source optical system 170 is configured to guide light that passes through the rotational wheel device 100.

The excitation light shining device 70 can be disposed in an arbitrary position, and in this first embodiment, the excitation light shining device 70 is disposed in a position lying near a center of the housing of the projector 10 and closer to the front panel 12. The excitation light shining device 70 is held by a shared holding member and includes multiple blue laser diodes 71 (an excitation light source) and collimator lenses 73. The multiple blue laser diodes 71 are arranged into a matrix configuration. A cooling fan 81 is provided on a side of the excitation light shining device 70 which faces the front panel 12, so that the blue laser diodes 71 and the rotational wheel device 100 are cooled by this cooling fan 81.

The collimator lenses 73 are individually disposed on optical axes of the multiple blue laser diodes 71 in such a manner as to convert light emitted from each of the multiple blue laser diodes 71 into parallel light so as to enhance the directivity of the emitted light. Each collimator lens 73 is disposed in such a manner as to be offset towards a center blue laser diode 71 in the matrix configuration with respect to an optical axis of the corresponding blue laser diode 71. Light in the blue wavelength range emitted from each blue laser diode 71 constitutes light which is limited within a predetermined range by the corresponding collimator lens 73. An optical member such as a collective lens or the like which collects light in the blue wavelength range emitted from each blue laser diode 71 by way of the corresponding collimator lens 73 may be disposed on an optical path between the collimator lenses 73 and the rotational wheel device 100.

In this first embodiment, although the configuration is described in which the collimator lenses 73 are disposed on the optical axes of the corresponding blue laser diodes 71, for example, a configuration may be adopted in which optical fibers are individually disposed on the optical axes of the blue laser diodes 71. In this case, the excitation light shining device 70 further includes the optical fibers, and an entrance portion of the optical fiber is disposed on the optical axis of each laser diode 71, while an exit portion of the optical fiber is disposed towards the rotational wheel device 100. In the case that the optical fibers are used, the arrangement of the blue laser diodes 71 is not limited to the position illustrated in FIG. 2. In a certain embodiment, the multiple blue laser diodes 71 may be disposed outside the housing of the projector 10. In addition, in this first embodiment, although the configuration is described in which the multiple laser diodes 71 are provided, a configuration may be adopted in which one laser diode 71 is disposed so as to constitute a light source of excitation light. Additionally, the excitation light source is not limited to the blue laser diode, and hence, any light source can be adopted as long as it emits light in the first wavelength range. In a certain embodiment, a blue light emitting diode (LED) may be used as the excitation light source.

Figure 3A:
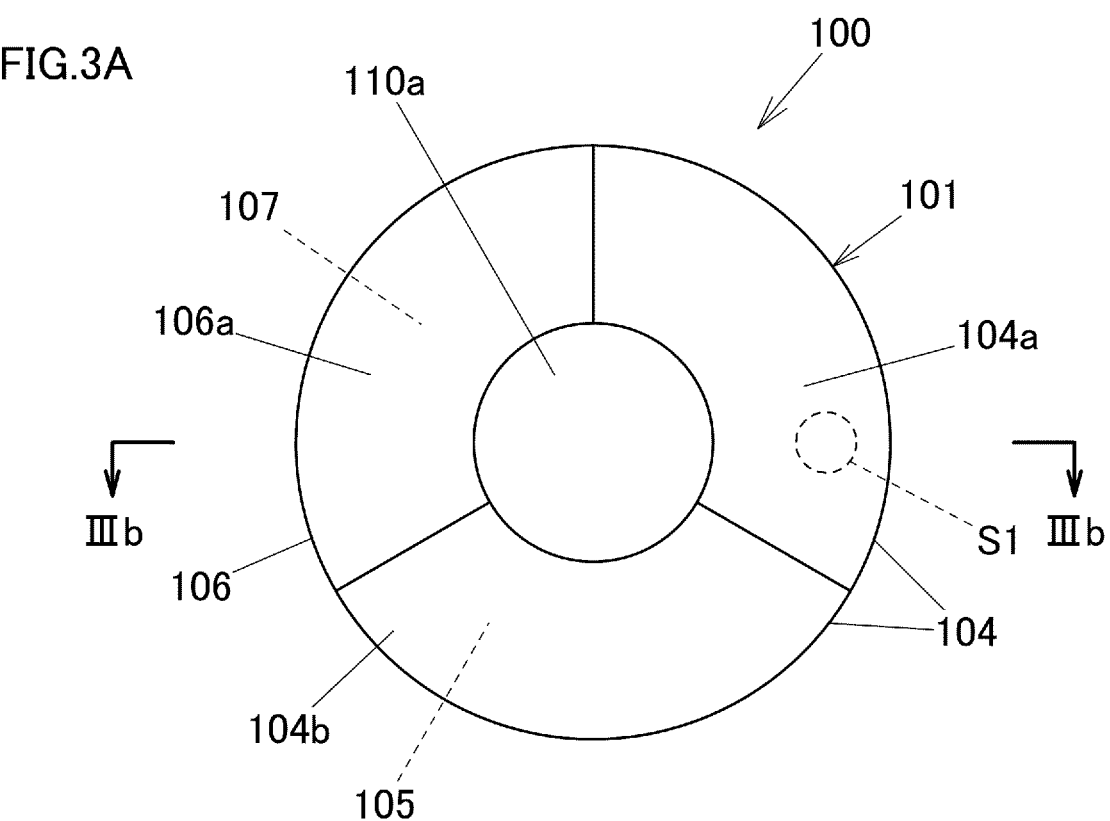
FIG. 3A is a schematic diagram showing a rotational wheel device according to the first embodiment, which is a schematic plan view of a rotational wheel.
Figure 3B:
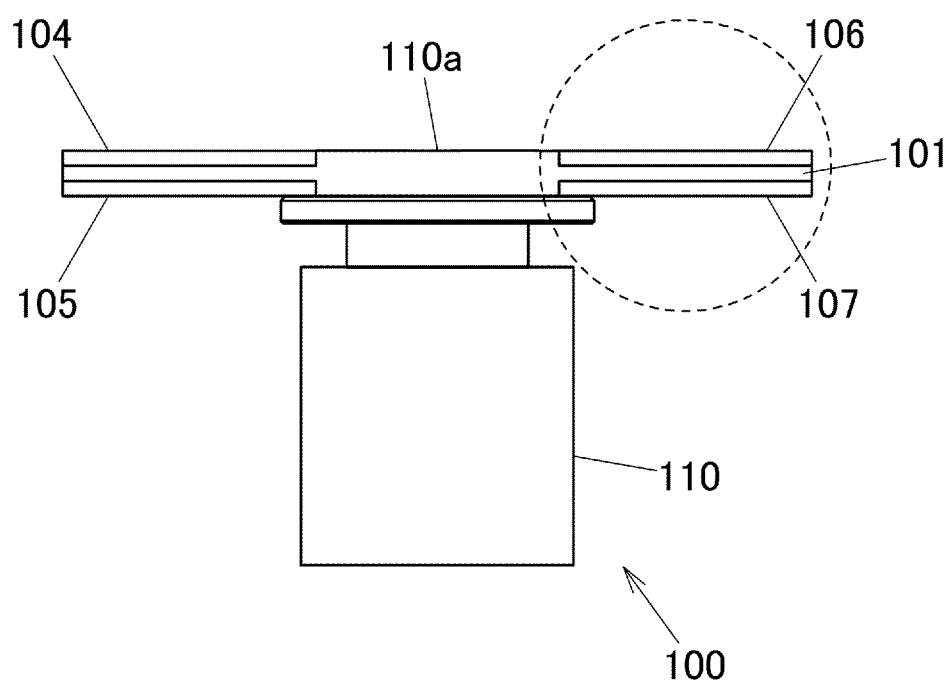
FIG. 3B is a schematic sectional view showing a section taken along a line IIIb-IIIb in FIG. 3A.

The configuration of the rotational wheel device 100 will be described. The rotational wheel device 100 is disposed on an optical path of excitation light emitted from the excitation light shining device 70 on an exit side, that is, a side where the blue laser diodes 71 and the collimator lenses 73 are disposed, of the excitation light shining device 70. The rotational wheel device 100 has a rotational wheel 101 and a motor 110. As shown in FIGS. 3A, 3B, the rotational wheel 101 has a circular disc-like shape and is rotationally supported on a motor shaft 110a of the motor 110 at a central portion thereof, whereby the rotational wheel 101 is driven to rotate about the motor shaft 110a as a result of the motor 110 being driven. The rotational wheel 101 is disposed at an inclined angle with respect to a plane including a luminescent light emission area 202 of the fixed luminescent body 200, which will be described later, so that light emitted from the excitation light shining device 70 is incident obliquely on a plate surface (a front surface) of the rotational wheel 101. In the light source apparatus 60, the excitation light shining device 70 and the fixed luminescent body 200, which will be described later, are disposed on a front surface side (a side opposite to a side where the motor 110 is disposed) of the rotational wheel 101. In other words, the excitation light shining device 70 and the fixed luminescent body 200 are disposed on the same side with respect to the plate surface of the rotational wheel 101, and the excitation light shining device 70 and the fixed luminescent body 200 (a luminescent light emission device) are disposed in such a manner as to face the plate surface of the rotational wheel 101.

The rotational wheel 101 is formed of a transparent material such as glass, resin, or the like which has transmissivity. The rotational wheel 101 is a color wheel having a filter area 104 and a direction-changing transmission area 106. The filter area 104 includes a first filter area 104a and a second filter area 104b, which are provided on, of both plate surfaces of the rotational wheel 101, the plate surface which faces the excitation light shining device 70. The direction-changing transmission area 106 is provided in an area other than the filter area 104 on, of both the plate surfaces of the rotational wheel 101, the plate side (the front surface side) which faces the excitation light shining device 70. The first filter area 104a, the second filter area 104b, and the direction-changing transmission area 106 are provided end to end in a circumferential direction of the rotational wheel 101, and in an example illustrated in FIG. 3A. The first filter area 104a, the second filter area 104b, and the direction-changing transmission area 106 are individually disposed in such a manner as to extend circumferentially over an angular range of about 120 degrees. The portions on the front surface of the rotational wheel 101 which are occupied individually by the first filter area 104a, the second filter area 104b, and the direction-changing transmission area 106 are not limited to the angular range of about 120 degrees but may be changed as required.

The first filter area 104a and the second filter area 104b of the filter area 104 are processed into a dichroic mirror configured to transmit light in one wavelength range in the wavelength range of luminescent light emitted from the luminescent light emission area 202, which will be described later, but to reflect light in a predetermined wavelength range which is made up of excitation light and light in the other wavelength range in the wavelength range of the luminescent light. Specifically speaking, the first filter area 104a transmits light in the green wavelength range (light in the fourth wavelength range) but reflects light in the blue wavelength range (light in the first wavelength range), which is regarded as the wavelength rage of excitation light, and light in the red wavelength range (light in the third wavelength range). The second filter area 104b transmits light in the red wavelength range but reflects light in the blue wavelength range and light in the green wavelength range.

FIG. 3B is schematic sectional view of the rotational wheel 101. The rotational wheel 101 includes an excitation light reflection area 105 defined in an area, which corresponds to the first filter area 104a and the second filter area 104b, on a surface of an opposite side (a surface on an opposite side to the side which faces the excitation light shining device 70). The excitation light reflection area 105 transmits light in other wavelength ranges than light in the blue wavelength range, which is the wavelength range of excitation light, and reflects light in the blue wavelength range.

Figure 4A:
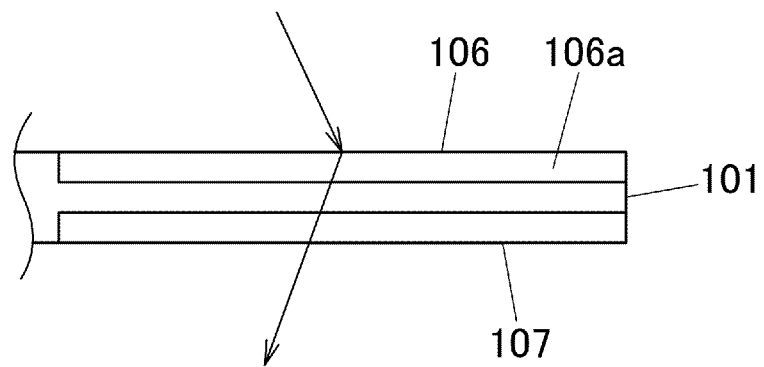
FIG. 4A is a schematic sectional view of the rotational wheel device, showing a portion of the rotational wheel surrounded by a broken line in FIG. 3B in an enlarged fashion.

The direction-changing transmission area 106 transmits light in the blue wavelength range, which is referred to as the wavelength range of excitation light, while changing its direction. Upon being incident on the direction-changing transmission area 106, light in the blue wavelength range is refracted so as to be guided towards a light tunnel 175, which will be described later. Specifically speaking, light in the blue wavelength range that is incident on the direction-changing transmission area 106 is refracted at such an angle that an axis of the light in the blue wavelength range is superposed on a light guiding direction of the light guiding optical system 170, which will be described later. In this first embodiment, as shown in FIG. 4A, a transmissive diffraction grating 106a (a diffraction grating), which is configured to diffract light in the blue wavelength range to the direction-changing transmission area 106, is formed on the direction-changing transmission area 106. The transmissive diffraction grating 106a, which makes up the direction-changing transmission area 106, can easily be formed by providing grooves on the plate surface of the rotational wheel 101. As a result of the formation of the transmissive diffraction grating 106a, upon being incident on the direction-changing transmission area 106, light in the blue wavelength range is guided in an optical path indicated by arrows in FIG. 4A. A diffuse characteristic may be given to the direction-changing transmission area 106 so as to diffuse light in the blue wavelength range as required.

Figure 4B:
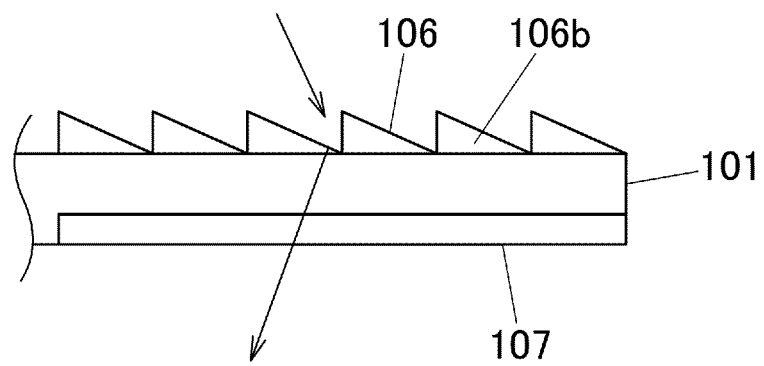
FIG. 4B is a schematic sectional view showing a modified example of the portion shown in FIG. 4A.
Figure 4C:
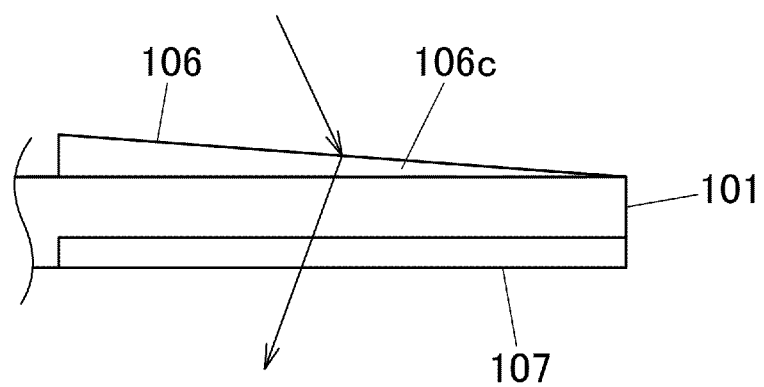
FIG. 4C is a schematic sectional view showing another modified example of the portion shown in FIG. 4A.

In this first embodiment, although the configuration is described in which the transmissive diffraction grating 106a is formed at the direction-changing transmission area 106, as shown in FIG. 4B, a configuration may be adopted in which multiple minute transmissive refraction members 106b (refraction members), which each have an inclined surface for refracting light in the blue wavelength range and which are disposed in a concentric circle-like fashion, are formed at the direction-changing transmission area 106. Additionally, as shown in FIG. 4C, a configuration may be adopted in which one transmissive refraction member 106c, which has an inclined surface for refracting light in the blue wavelength range, is formed at the direction-changing transmission area 106. As these occur, upon being incident on the direction-changing transmission area 106, light in the blue wavelength range is guided along optical paths indicated by arrows in FIGS. 4B, 4C. The direction-changing transmission area 106 made up of the multiple transmissive refraction members 106b or the one transmissive refraction member 106c can easily be formed by providing the multiple transmissive refraction members 106b or the one transmissive refraction member 106c on the plate surface of the rotational wheel member 101.

The rotational wheel 101 includes a transmissive diffusion area 107 at an area, which corresponds to the direction-changing transmission area 106, on the opposite surface (the opposite surface to the side that face the excitation light shining device 70) thereof. The transmissive diffusion area 107 diffuses light in the blue wavelength range which has passed through the direction-changing transmission area 106. In a certain embodiment, the rotational wheel 101 may not include the transmissive diffusion area 107. For example, in the case that the quality of an image that is projected on the projection target object is good enough even though light in the blue wavelength range is not diffused by the rotational wheel 101, the rotational wheel 101 may not have the transmissive diffusion area 107.

The rotational wheel device 100 is disposed so that an axis of light in the blue wavelength rage whose direction has been changed at the direction-changing transmission area 106 and which has passed through the direction-changing transmission area 106 is superposed on an axis of luminescent light which has passed through the first filter area 104a or the second filter area 104b. That is, the rotational wheel device 100 has a function to combine light in the blue wavelength range which passes through the direction-changing transmission area 106 with light in the green wavelength range and light in the red wavelength range which pass through the filter area 104 in such a manner that their axes coincide. Specifically speaking, the excitation light shining device 70, the rotational wheel device 100, and the fixed luminescent body 200 (the luminescent light emission device) are disposed in such a manner that an axis of light in the blue wavelength range which has passed through the direction-changing transmission area 106 and an axis of luminescent light which has passed through the filter area 104 are superposed on each other.

Returning to FIG. 2, the light guiding optical system 140 includes a first collective lens 141 (a light guiding member) and a second collective lens 142 (a light guiding member). The first collective lens 141 has a diameter smaller than that of the second collective lens 142 and is disposed between the second collective lens 142 and the fixed luminescent body 200. The first collective lens 141 and the second collective lens 142 refract a ray of light in the blue wavelength range which is reflected on the filter area 104 of the rotational wheel device 100 towards the fixed luminescent body 200 and collects a ray of light which is emitted from the fixed luminescent body 200 towards the rotational wheel device 100. Specifically speaking, a ray of light emitted from the fixed luminescent body 200 towards the rotational wheel device 100 is collected so as to be incident on the first filter area 104a or the second filter area 104b of the rotational wheel device 100.

The fixed luminescent body 200 is made up of a base 201 and the luminescent light emission area 202, and the like. The base 201 can be formed of a metallic material such as copper, aluminum, or the like. A flat reflecting portion, which is mirror finished through silver deposition or the like, is formed on a surface of the base 201 which faces the rotational wheel device 100. The luminescent light emission area 202 is disposed on the reflecting portion on a front surface of the base 201. A first head sink 150 is provided on a side of the fixed luminescent body 200 which faces the right panel 14, whereby the fixed luminescent body 200 is cooled.

The luminescent light emission area 202 is made up of a luminescent material layer on which luminescent material particles are dispersed. The luminescent material particles are excited by light in the blue wavelength range as excitation light which is shined on the luminescent light emission area 202 to thereby emit luminescent light which is light in the yellow wavelength range (light in a second wavelength range). A part of the excitation light shined on the luminescent light emission area 202 excites the luminescent material particles, whereby luminescent light is emitted from the luminescent light emission area 202, and the other part of the excitation light is reflected at the reflecting portion of the base 201 which is mirror finished to thereby excite the luminescent material particles. However, a part of the excitation light which is reflected at the reflecting portion of the base 201 is emitted as it is from the luminescent light emission area 202 without exciting the luminescent material particles. In addition, when the luminescent material particles are excited, luminescent light is emitted in every direction, and a part of the luminescent light is emitted as it is from the luminescent light emission area 202, while the other part of the luminescent light is emitted from the luminescent light emission area 202 after having been reflected by the base 201.

Luminescent light in the yellow wavelength range which is emitted from the luminescent light emission area 202 and is then incident on the filter area 104 of the rotational wheel device 100 is separated into light in a predetermined wavelength range which differs from the wavelength range of the excitation light by the filter area 104. Specifically speaking, the luminescent light in the yellow wavelength range includes light in the red wavelength range and light in the green wavelength range, and the light in the red wavelength range is reflected by the first filter area 104a to thereby be removed, so that the light in the green wavelength range is separated to pass through the rotation wheel device 100, while the light in the green wavelength range is reflected by the second filter area 104b to thereby be removed, so that the light in the red wavelength range is separated to pass through the rotation wheel device 101.

In this first embodiment, although the configuration is described in which the light source apparatus 60 includes the red-green light source device 80, a configuration may be adopted in which a red light source device for emitting light in the red wavelength range is provided separately, and the luminescent light emission area 202 of the fixed luminescent body 200 is made up of a luminescent material layer for emitting light in the green wavelength range. In this case, the rotational wheel 101 of the rotational wheel device 100 has a filter area configured to reflect light in the blue wavelength rage and transmit light in the green wavelength range in place of the filter area 104 and the direction-changing transmission area 106. Then, a dichroic mirror, which is configured to transmit light in the blue wavelength range and light in the green wavelength range and reflect light in the red wavelength range, is disposed between the light guiding optical system 140 and the light tunnel 175. The red light source device, which includes a red light source made up of a semiconductor light emitting element such as a red light emitting diode or the like, is disposed so that light in the red wavelength range which the red light source emits is emitted towards the dichroic mirror in a direction from the back panel 13 towards the front panel 12. Light in the red wavelength range which is reflected by the dichroic mirror is incident on the light tunnel 175. Luminescent light in the green wavelength range emitted from the fixed luminescent body 200 passes through the filter area and the dichroic mirror to be incident on the light tunnel 175. Light in the blue wavelength range which passes through the rotational wheel 101 while its direction is being changed by the direction-changing transmission area 106 passes through the dichroic mirror to be incident on the light tunnel 175.

The light source optical system 170 includes the light tunnel 175 as a light guiding member, a third collective lens 178, a fourth collective lens 179, a shining mirror 185, a condenser lens 195, and the like. Since the condenser lens 195 emits image light emitted from the display device 50 disposed on a side of the condenser lens 195 which faces the back panel 13 towards the projection optical system 220, the condenser lens 195 also constitutes a part of the projection optical system 220.

The light tunnel 175, the third collective lens 178, the fourth collective lens 179, and the shining mirror 185 are sequentially disposed in that order on an optical axis of the rotational wheel device 100 on a side thereof which faces the left panel 15. Light emitted from an exit port of the light tunnel 175 is collected by the third collective lens 178 and the fourth connection lens 179 and is then shined on to the display device 50 at a predetermined angle by way of the condenser lens 195 by the shining mirror 185.

Figure 5:
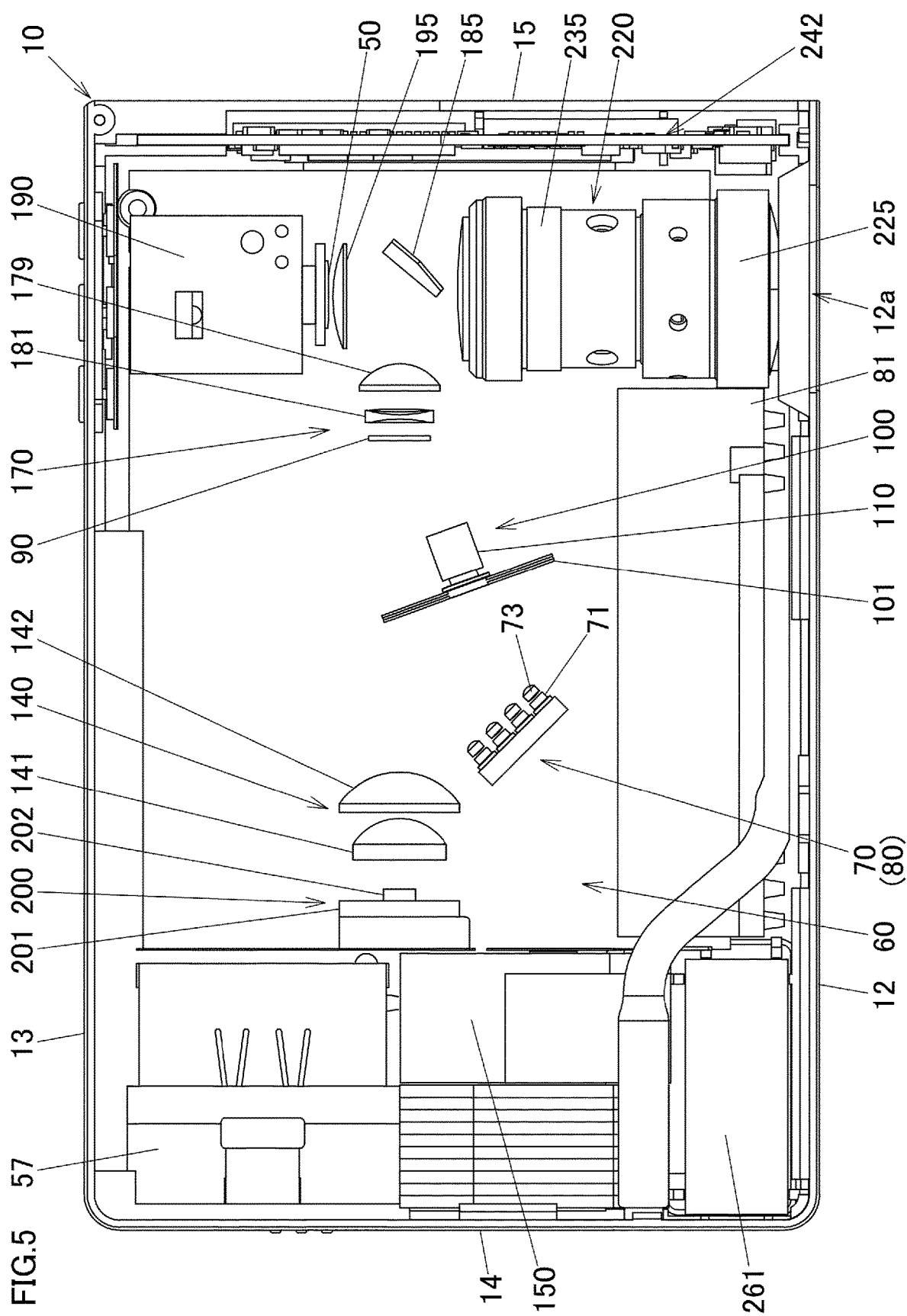
FIG. 5 is a schematic plan view showing an internal structure of a projector according to a modified example of the first embodiment.

In this first embodiment, although the configuration is described in which the light tunnel 175 is disposed at a portion of the light source optical system 170, a configuration may be adopted in which a light guiding rod is disposed in place of the light tunnel 175. Light can be guided efficiently by using the light guiding rod in place of the light tunnel 175. As a modified example of the first embodiment, as shown in FIG. 5, a configuration may be adopted in which a microlens array 90 is disposed in place of the light tunnel 175, and a concave lens 181 is disposed in place of the third collective lens 178. Space can be saved more by using the microlens array 90 than by using the light tunnel 175.

The projection optical system 220 is made up of the condenser lens 195, the movable lens group 235, and a fixed lens group 225. The fixed lens group 225, which is disposed on an optical axis of the condenser lens 195 on a side facing the front panel 12, is incorporated inside a fixed lens barrel so as to be moved manually or automatically for zooming or focusing.

Figure 6:
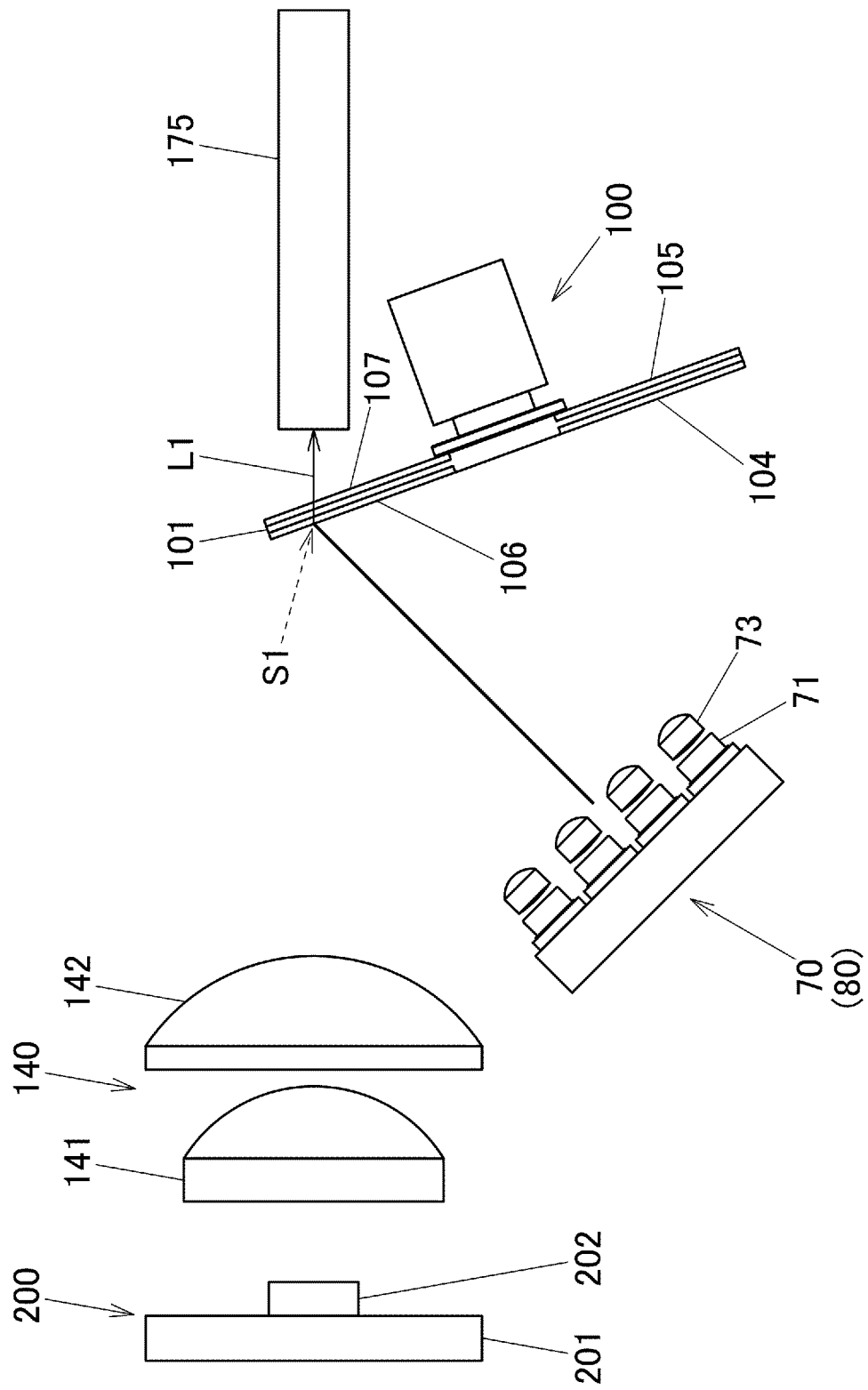
FIG. 6 is a schematic plan view showing how excitation light shined on the rotational wheel device according to the first embodiment passes through the rotational wheel device.

Next, an entrance and exit of light into and from the rotational wheel device 100 will be described. Firstly, referring to FIG. 6, a case will be described in which light in the blue wavelength range, which is excitation light, exits from the rotational wheel device 100. Here, a position on the rotational wheel 101 where excitation light (light L1 indicated by a solid line in FIG. 6) is incident is referred to as a shining spot S1 (also refer to FIG. 3A). In FIG. 6, the direction-changing transmission area 106 of the rotational wheel 101 is positioned in the shining spot S1.

Excitation light emitted from the excitation light shining device 70 is obliquely incident on the front plate surface of the rotational wheel 101. When the direction-changing transmission area 106 is positioned in the shining spot S1, the excitation light, which is obliquely incident on the rotational wheel 101, is incident on the direction-changing transmission area 106 of the rotational wheel 101. The excitation light, which is incident on the direction-changing transmission area 106, passes through the direction-changing transmission area 106 while its direction is being changed towards the light tunnel 175 by the direction-changing transmission area 106, further passes through the transmissive diffusion area 107 while being diffused at the transmissive diffusion area 107, and is eventually emitted from the rotational wheel 101 towards the light tunnel 175. As a result, the excitation light, which is the light in the blue wavelength range, can be used as light source light.

Next, referring to FIG. 7, a case in which luminescent light in the green wavelength rage is emitted from the rotational wheel device 100 and a case in which luminescent light in the red wavelength range is emitted from the rotational wheel device 100 will be described. In FIG. 7, the first filter area 104a or the second filter area 104b of the filter area 104 on the rotational wheel 101 is positioned in the shining spot S1.

Excitation light emitted from the excitation light shining device 70 to be obliquely incident on the plate surface (the front surface) of the rotational wheel 101 is incident on the first filter area 104a or the second filter area 104b of the filter area 104 on the rotational wheel 101. The excitation light incident on the filter area 104 is reflected towards the light guiding optical system 140 by the filter area 104.

The excitation light reflected towards the light guiding optical system 140 (light L2 indicated by a solid line in FIG. 7) is incident on the second collective lens 142 and is refracted sequentially through the second collective lens 142 and the first collective lens 141, eventually irradiating the luminescent light emission area 202 of the fixed luminescent body 200. In the light source apparatus 60, since the rotational wheel 101 is disposed at the angle at which the rotational wheel 101 is inclined from the plane including the luminescent light emission area 202 of the fixed luminescent body 200, excitation light reflected on the filter area 104 can be collected by the first collective lens 141 and the second collective lens 142. When the excitation light is shined on the luminescent material particles of the luminescent light emission area 202, luminescent light in the yellow wavelength range (light L3 indicated by an alternate long and short dash line in FIG. 7) is emitted in every direction. Here, in light emitted from the luminescent light emission area 202, there exist luminescent light in the yellow wavelength range and excitation light which is reflected by the base 201 without being shined on the luminescent material particles (hereinafter, referred to as "residual excitation light"). In the luminescent light emitted from the luminescent light emission area 202 and the residual excitation light, luminescent light and residual excitation light which are emitted towards the light source optical system 140 are collected by the first collective lens 141 and the second collective lens 142 and are then incident on the rotational wheel 101.

In the case that the first filter area 104a is positioned at the shining spot S1 of the rotational wheel 101, luminescent light in the red wavelength range in the luminescent light in the yellow wavelength range is reflected by the first filter area 104a to thereby be removed, and luminescent light in the green wavelength range passes through the first filter area 104a. In addition, a part of the residual excitation light which is incident on the first filter area 104a is reflected by the first filter area 104a to thereby be removed. Then, residual excitation light which cannot be removed by the first filter area 104a to pass therethrough is reflected by an excitation light reflection area 105 to thereby be removed. Similarly, in the case that the second filter area 104b is positioned at the shining spot S1, luminescent light in the green wavelength range in the luminescent light in the yellow wavelength range is reflected by the second filter area 104b to thereby be removed, and luminescent light in the red wavelength range passes through the second filter area 104b. A part of the residual excitation light which is incident on the second filter area 104b is reflected by the second filter area 104b to thereby be removed. Then, residual excitation light which cannot be removed by the second filter 104b to pass therethrough is reflected by the excitation light reflection area 105 to thereby be removed. Light in the red wavelength range and light in the green wavelength range from which the residual excitation light is almost removed (light L4 indicated by an alternate long and short dash line in FIG. 7) can be obtained by interposing the excitation light reflection area 105 in the way described above. In a certain embodiment, the filter area 104 may not have the excitation light reflection area 105. For example, in the case that residual excitation light is removed to an allowable level by the first filter area 104a and the second filter area 104b, the filter area 104 may not have the excitation light reflection area 105.

The light in the red wavelength range and the light in the green wavelength range which pass through the filter area 104 are emitted towards the light tunnel 175. As this occurs, optical paths of the light in the red wavelength range and the light in the green wavelength range which travel from the rotational wheel device 100 towards the light tunnel 175 are the same as an optical path of the excitation light which travels from the rotational wheel device 100 towards the light tunnel 175. That is, the rotational wheel device 100 is disposed in such a position at such an angle that an axis of the excitation light which has passed through the direction-changing transmission area 106 and axes of the light in the red wavelength range and the light in the green wavelength range which pass through the filter area 104 are superposed on each other.

Thus, as has been described heretofore, with the right source apparatus 60 of this first embodiment, the optical path of light in the blue wavelength range, which is excitation light, coincides in position with the optical path of light in the red wavelength range, which differs from excitation light, and the optical path of light in the green wavelength range, which also differs from excitation light, whereby the number of components involved can be reduced more than with the conventional light source apparatus in which the optical path of excitation light is separated from the optical paths of lights in different wavelength ranges from that of excitation light, thereby making it possible to reduce the size and increase the efficiency of the light source apparatus. In addition, with the light source apparatus 60, the generation of color shading can be reduced which is caused by an inaccuracy attributed to the configuration in which the optical path of excitation light is separated from the optical paths of lights in different wavelength ranges from that of the excitation light. Further, since the rotational wheel 101 has the direction-changing transmission area 106 which transmits excitation light while changing the direction of the excitation light, an exclusive member for changing the direction of excitation light is not needed, thereby making it possible to reduce the size of the light source apparatus 60.

Further, with the light source apparatus 60, in the case that light in the blue wavelength range, which is excitation light, is emitted towards the light source optical system 170, the light in the blue wavelength range can be guided towards the light source optical system 170 without travelling by way of the fixed luminescent body 200 by changing its direction at the direction-changing transmission area 106 of the rotational wheel device 100. As a result, the optical path of the light in the blue wavelength range and the optical path of luminescent light emitted from the fixed luminescent body 200 are prevented from being superposed on each other between the rotational wheel device 100 and the fixed luminescent body 200, and hence, a configuration for emitting light in the blue wavelength range through spectra separation by use of a color wheel does not have to be provided separately, thereby making it possible to reduce the size of the light source apparatus 60.

With the light source apparatus 60, the excitation light shining device 70 and the fixed luminescent body 200 are disposed on the front surface side of the rotational wheel device 100, that is, on the opposite side to the side where the motor 110 is disposed. As a result, the excitation light shining device 70 and the fixed luminescent body 200 are hardly affected by heat generated from the motor 110, and the excitation light shining device 70 and the fixed luminescent body 200 can be made to radiate heat efficiently, whereby the cooling fan provided in the light source apparatus 60 can be made small in size, thereby making it possible to reduce the size of the light source apparatus 60.

The projector 10 includes the display device 50 which receives light source light from the light source apparatus 60 to generate image light, the projection optical system 220 for projecting the image light emitted from the display device 50 on to the projection target object such as the screen or the like, and the processor for controlling the light source apparatus 60 and the display device 50. As a result, the projector 10 can be provided which can reduce the size while increasing the efficiency thereof, and reduce the generation of color shading.

Second Embodiment

Next, referring to FIGS. 8 and 9, a second embodiment of the present disclosure will be described. In describing the second embodiment, like configurations to those of the first embodiment will be omitted from the description or will be described briefly. In a light source apparatus according to the second embodiment, a rotational wheel device 300 is disposed at such an angle that a rotational wheel 301 of the rotational wheel device 300 becomes parallel to a surface (a surface including a luminescent light emission area 202) of a base 201 of a fixed luminescent body 200 which faces the rotational wheel device 300.

A filter area 304 of the rotational wheel 301 includes a first filter area and a second filter area on, of both plate surfaces of the rotational wheel 301, an opposite side to a side which faces an excitation light shining device 70. The first filter area and the second filter area are provided circumferentially end to end with an area (a transmissive diffusion area 107) which corresponds in position to a direction-changing transmission area 106 on an opposite side to a side where the direction-changing transmission area 106 is provided on a surface of the opposite side to the side which faces the excitation light shining device 70.

Figure 9A:
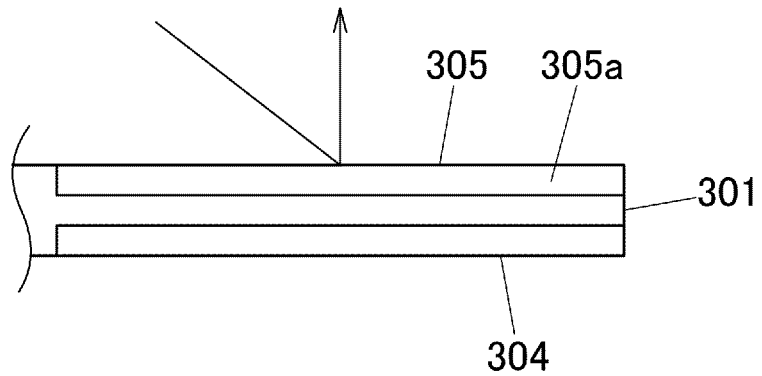
FIG. 9A is a schematic sectional view showing a direction-changing reflection area of the rotational wheel device in an enlarged fashion.

The rotational wheel 301 includes a direction-changing reflection area 305 at an area which corresponds in position to the first filter area and the second filter area on a surface of an opposite side to the side where the first filter area and the second filter area are provided on, of both the plate sides of the rotational wheel 301, the side which faces the excitation light shining device 70. The direction-changing reflection area 305 reflects light in the blue wavelength range or excitation light which is incident obliquely on the plate surface of the rotational wheel 301 in a normal direction of the plate surface of the rotational wheel 301. In addition, a dichroic coating or the like is applied to the direction-changing reflection area 305 so as to reflect light in the blue wavelength range but to transmit light in wavelength ranges other than the blue wavelength range. In this second embodiment, as shown in FIG. 9A, a reflective diffraction grating 305a is formed on the direction-changing reflection area 305 to diffract light in the blue wavelength range while reflecting it in the normal direction of the plate surface of the rotational wheel 301. Light in the blue wavelength range which is incident on the direction-changing reflection area 305 is reflected in an optical path indicated by an arrow shown in FIG. 9A by the formation of the reflective diffraction grating 305a. This direction-changing reflection area 305 may be provided with a diffusion characteristic to diffuse light in the blue wavelength range as required.

Figure 9B:
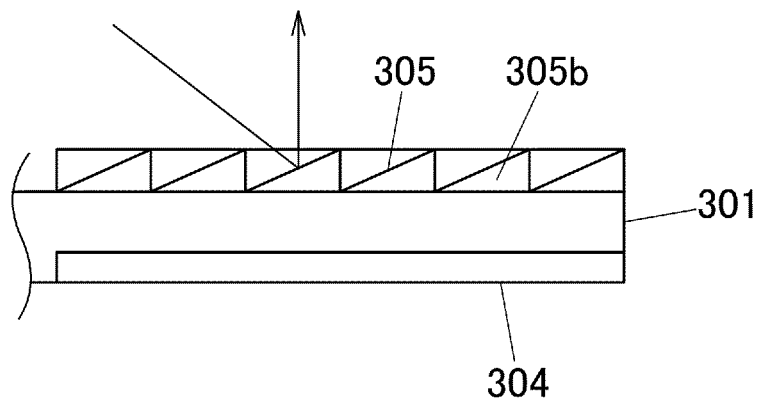
FIG. 9B is a schematic sectional view showing a modified example of the portion shown in FIG. 9A.
Figure 9C:
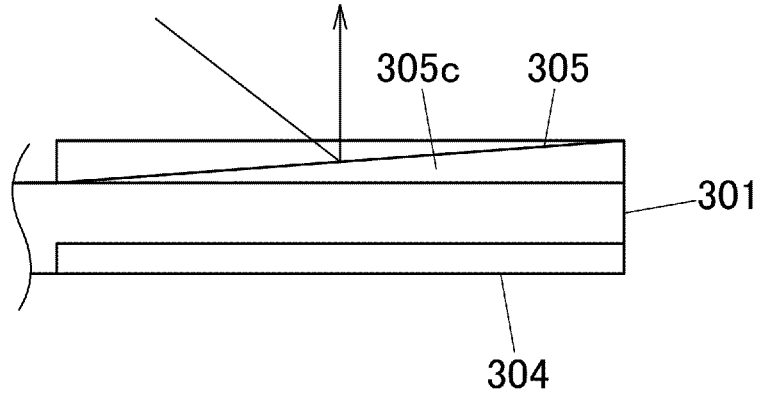
FIG. 9C is a schematic sectional view showing another modified example of the portion shown in FIG. 9A.

In this second embodiment, although the configuration is described in which the reflective diffraction grating 305a is formed on the direction-changing reflection area 305, a configuration may be adopted in which multiple minute reflective refraction members 305b (refraction members), each having an inclined surface configured to reflect light in the blue wavelength range at a predetermined angle, are formed on the direction-changing reflection area 305, as shown in FIG. 9B. Additionally, a configuration may also be adopted in which one reflective refraction member 305c, having an inclined surface configured to reflect light in the blue wavelength range at a predetermined angle, is formed on the direction-changing reflection area 305, as shown in FIG. 9C. As these occur, the predetermined angle is an angle at which light in the blue wavelength range is reflected towards the light guiding optical system 140, and light in the blue wavelength range which is incident on the direction-changing reflection area 305 is reflected along optical paths like those indicated by arrows in FIGS. 9B, 9C.

Next, referring to FIG. 8, an entrance and exit of light into and from the rotational wheel device 300 in the second embodiment will be described by referring to a case in which luminescent light in the green wavelength range is emitted from the rotational wheel device 300 and a case in which luminescent light in the red wavelength range is emitted from the rotational wheel device 300. Excitation light, which is emitted from the excitation light shining device 70 and is incident obliquely on the plate surface of the rotational wheel 301, is incident on the direction-changing reflection area 305 of the rotational wheel 301. The excitation light incident on the direction-changing reflection area 305 is reflected in the normal direction of the plate surface of the rotational wheel 301 by the direction-changing reflection area 305 and then travels towards the light guiding optical system 140.

The excitation light (light L5 indicated by a solid line in FIG. 8), which is reflected towards the light guiding optical system 140, is incident sequentially on a second collective lens 142 and a first collective lens 141 in that order in such a manner that an axis of the excitation light follows an optical axis direction of the second collective lens 142 and an optical axis of the first collective lens 141 and irradiates the luminescent light emission area 202 of the fixed luminescent body 200. As this occurs, the excitation light irradiates the luminescent light emission area 202 in such a manner that the excitation light is shined perpendicularly on a plate surface of the base 201 of the fixed luminescent body 200. Luminescent light in the yellow wavelength range (light L6 indicated by an alternate long and short dash line in FIG. 8) and residual excitation light which are emitted from the luminescent light emission area 202 as a result of the excitation light irradiating the luminescent light emission area 202 are collected by the first collective lens 141 and the second collective lens 142 to thereby be incident on the direction-changing reflection area 305 of the rotational wheel 301. In this second embodiment, since excitation light reflected at the direction-changing reflection area 305 of the rotational wheel 301 can be shined on the luminescent light emission area 202 even though the rotational wheel 301 is disposed at such an angle that the rotational wheel 301 becomes parallel to the plane including the luminescent light emission area 202 of the luminescent light emission device 200, the design of the light source apparatus 60 can be facilitated when compared with a case in which the rotational wheel 301 is inclined with respect to the luminescent light emission area 202.

The luminescent light incident on the direction-changing reflection area 305 of the rotational wheel 301 passes through the direction-changing reflection area 305 and is then incident on the first filter area or the second filter area of the filter area 304 where the luminescent light is separated into light in the red wavelength range and light in the green wavelength range, so that the light in the red wavelength range and the light in the green wavelength range are emitted towards a light tunnel 175. As this occurs, optical paths of the light in the red wavelength range and the light in the green wavelength range which travel from the rotational wheel device 300 towards the light tunnel 175 coincide with the optical path of the excitation light travelling from the rotational wheel device 300 towards the light tunnel 175. That is, the rotational wheel device 300 is disposed in such a position at such an angle that the axis of the excitation light which has passed through the direction-changing transmission area 106 and the axes of the light in the red wavelength range and the light in the green wavelength range which have passed through the filter area 304 are superposed on each other. Specifically speaking, the excitation light shining device 70, the rotational wheel device 300, and the fixed luminescent body 200 (the luminescent light emission device) are disposed in such positions at such angles that the axis of the excitation light which has passed through the direction-changing transmission area 106 and the axes of the light in the red wavelength range and the light in the green wavelength range which have passed through the filter area 304 are super posed on each other.

In this way, with the light source apparatus according to the second embodiment, too, the optical path of light in the blue wavelength range, which is excitation light, coincides in position with the optical path of light in the red wavelength range, which differs from excitation light, and the optical path of light in the green wavelength range, which also differs from excitation light, whereby the number of components involved can be reduced more than with the conventional light source apparatus in which the optical path of excitation light is separated from the optical paths of lights in different wavelength ranges from that of excitation light. As a result, the size of the light source apparatus can be reduced while the efficiency thereof can be increased, and the generation of color shading can be reduced.

Third Embodiment

Next, referring to FIGS. 10 and 11, a third embodiment of the present disclosure will be described. In describing the third embodiment, like configurations to those of the first embodiment will be omitted from the description or will be described briefly. A light source apparatus according to the third embodiment includes a luminescent wheel device 400 as a luminescent light emission device. The luminescent wheel device 400 has a luminescent wheel 401 having a circular disc-like shape and a luminescent light emission area 402, which is formed on the luminescent wheel 401. The luminescent wheel 401 is rotationally supported on a motor shaft of a motor at a central portion thereof, whereby the luminescent wheel 401 is driven to rotate about the motor shaft as a result of the motor being driven. A flat reflection portion, which is mirror finished through silver deposition or the like, is formed on, of both plate surfaces of the luminescent wheel 401, a side which faces a light guiding optical system 140. The luminescent light emission area 402 is disposed into an annular shape on the reflection portion on a front surface of the luminescent wheel 401.

Figure 11:
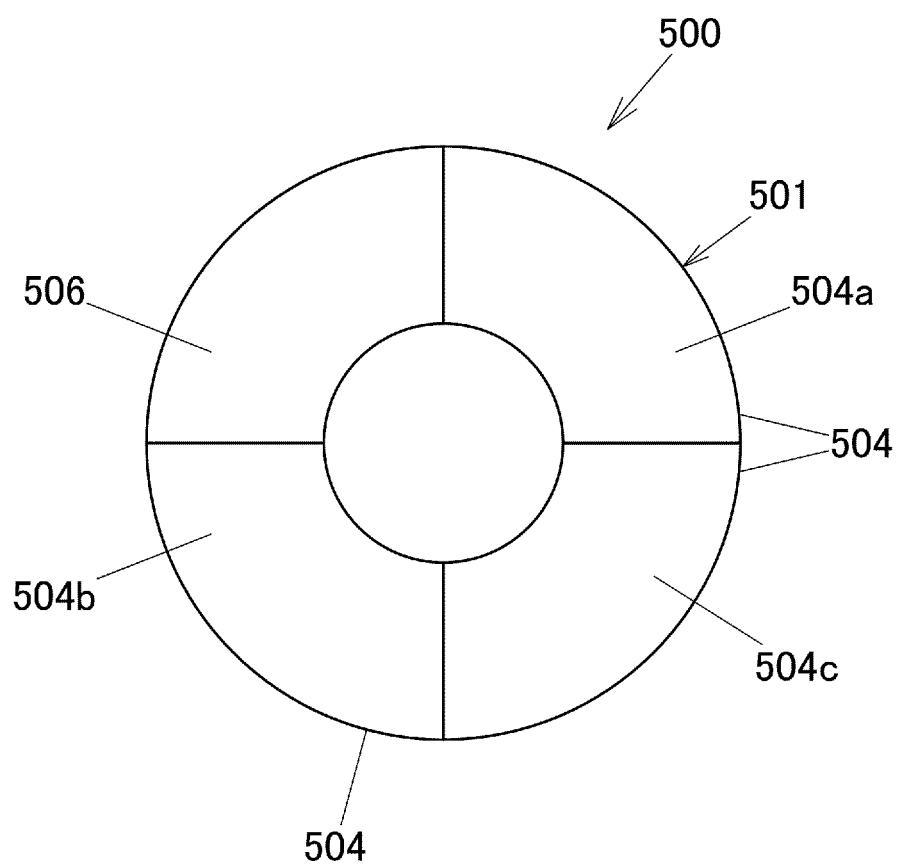
FIG. 11 is a schematic plan view of a rotational wheel according to the third embodiment.

As shown in FIG. 11, a rotational wheel device 500 includes a filter area 504 and a direction-changing transmission area 506 on, of both plate surfaces of a rotational wheel 501, a side which faces an excitation light shining device 70. Further, the filter area 504 includes a first filter area 504a, a second filter area 504b, and a third filter area 504c. The first filter area 504a, the second filter area 504b, the third filter area 504c, and the direction-changing transmission area 506 are provided end to end in a circumferential direction of the rotation wheel 501, and in a configuration shown in FIG. 11, those areas are each disposed to extend circumferentially over an angular range of about 90 degrees.

The first filter area 504a, the second filter area 504b, and the third filter area 504c are each finished into a dichroic mirror. The first filter area 504a transmits light in the green wavelength range and reflects light in the blue wavelength range and light in the red wavelength range. The second filter area 504b transmits light in the red wavelength range and reflects light in the blue wavelength range and light in the green wavelength range. The third filter area 504c transmits light in the yellow wavelength range and reflects light in the blue wavelength range, light in the green wavelength range, and light in the red wavelength range.

Figure 10:
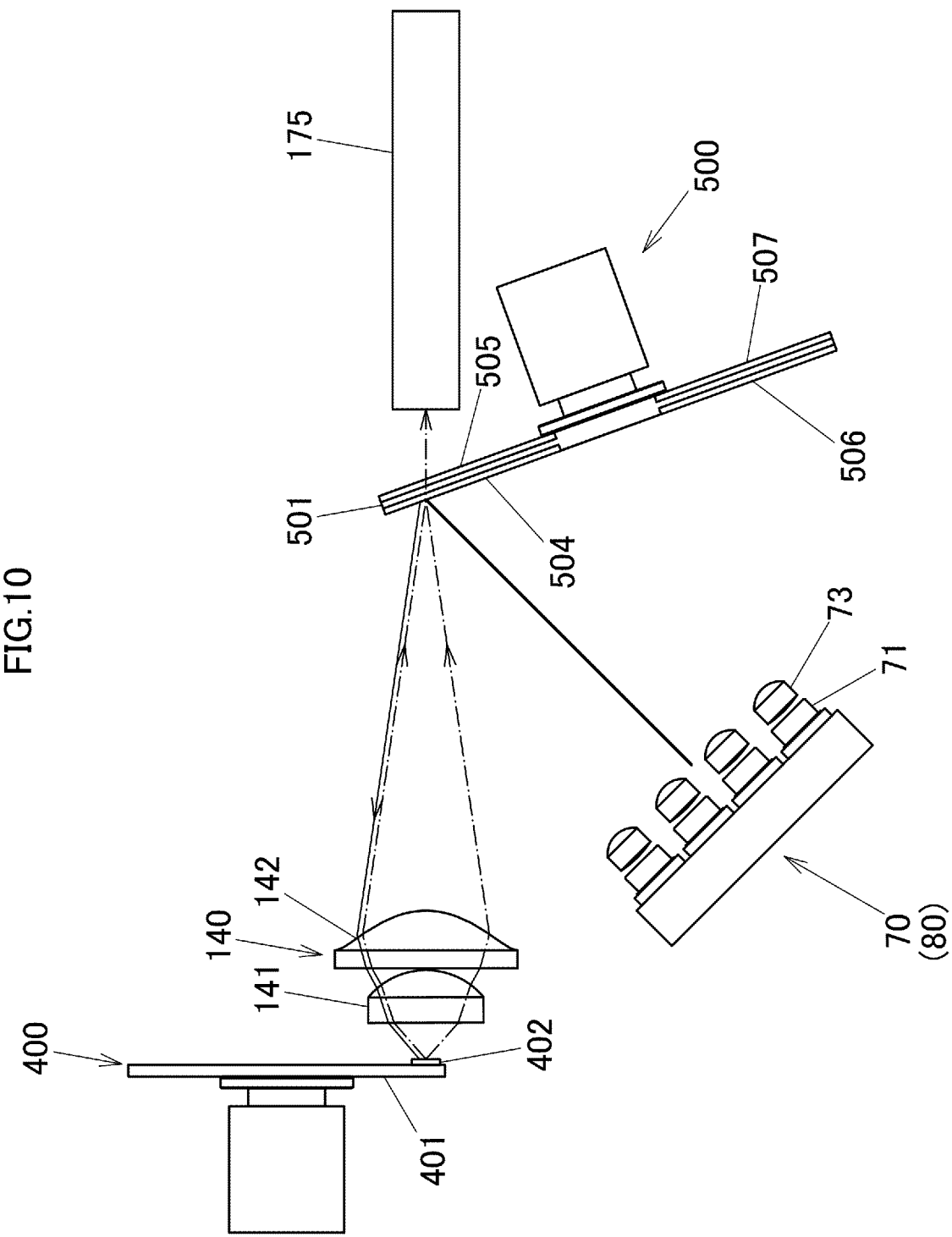
FIG. 10 is a schematic plan view showing how excitation light shined on a rotational wheel device according to a third embodiment passes through the rotational wheel device and how the excitation light shined on the rotational wheel device is reflected by the rotational wheel device and is then shined on a luminescent light emission area of a luminescent light emission device to thereby emit luminescent light.

As shown in FIG. 10, the rotational wheel 501 includes an excitation light reflection area 505 at an area which corresponds in position to the first filter area 504a, the second filter area 504b, and the third filter area 504c on a surface of an opposite side to a side of the rotational wheel 501 where the filter area 504 is provided. In addition, the rotational wheel 501 includes a transmissive diffusion area 507 at an area which corresponds in position to the direction-changing transmission area 506 on the surface of the opposite side to the side of the rotational wheel 501 where the direction-changing transmission area 506 is provided. With the light source apparatus according to this third embodiment, luminescent light emitted from the luminescent light emission area 402 is caused to pass through the third filter area 504c of the filter area 504 in accordance with a tint design, whereby light in the yellow wavelength range can be guided towards a light source optical system. In a certain embodiment, the rotational wheel 501 may not include the transmissive diffusion area 507 and may not include the excitation light reflection area 505.

As shown in FIG. 10, with the light source apparatus according to the third embodiment, too, an optical path of light in the blue wavelength range, which is excitation light, coincides with optical paths of light in the red wavelength range, light in the green wavelength range, and light in the yellow wavelength range, which differ from excitation light, (in FIG. 10, excitation light (light in the blue wavelength range) which is reflected towards the light guiding optical system 140 and excitation light which passes through the rotational wheel device 500 are indicated by a solid line, and luminescent light in the yellow wavelength range which is emitted from the luminescent light emission area 402 of the luminescent wheel device 400, and light in the red wavelength range, light in the green wavelength range, and light in the yellow wavelength range which passes through the rotational wheel device 500 are indicated by an alternate long and short dash line). As a result, the light source apparatus according to the third embodiment can provide similar advantageous effects to those (reduction in the size and increase in the efficiency of the light source apparatus, as well as reduction in the generation of color shading) provided by the light source apparatus 60 according to the first embodiment and the light source apparatus according to the second embodiment.

In addition, the color of luminescent light emitted from the luminescent light emission area 402 can be changed to colors other than light in the yellow wavelength range as required by using the luminescent wheel device 400 as the luminescent light emission device. Further, heat generated as a result of irradiation of the luminescent light emission area 402 with excitation light can be restrained from being concentrated to one portion thereof.

In a certain embodiment, the luminescent wheel device 400 may be used in place of the fixed luminescent body 200 also in the first embodiment and the second embodiment which have been described above. Further, in a certain embodiment, the configuration of the rotational wheel 501 described by reference to FIGS. 10 and 11 may also be applied to the first embodiment and the second embodiment. Specifically speaking, the filter area 104 (or the filter area 304) may have a third filter area similar to the third filter area 504c which transmits light in the yellow wavelength range and reflects light in the blue wavelength range, light in the green wavelength range, and light in the red wavelength range on the same side as the side where the first filter area 104a (or the first filter area of the filter area 304) and the second filter area 104b (or the second filter area of the filter area 304) are provided. In this case, the first filter area 104a (or the first filter area of the filter area 304), the second filter area 104b (or the second filter area of the filter area 304), the third filter area, and the direction-changing transmission area 106 (or the transmissive diffusion area 107) are provided end to end in the circumferential direction of the rotational wheel 101, 301.

Fourth Embodiment

Figure 12:
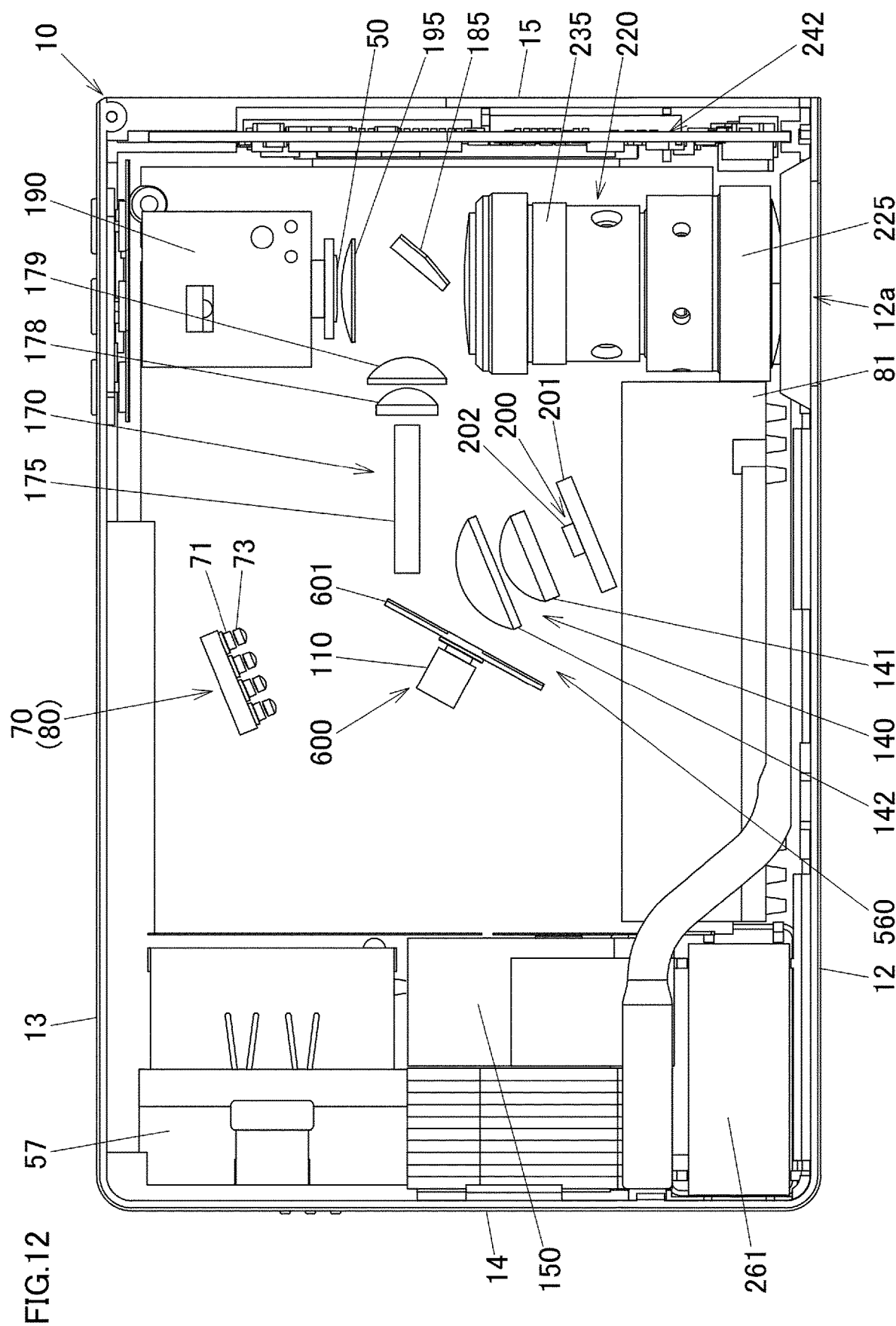
FIG. 12 is a schematic plan view showing an internal structure of a projector according to a fourth embodiment.
Figure 16:
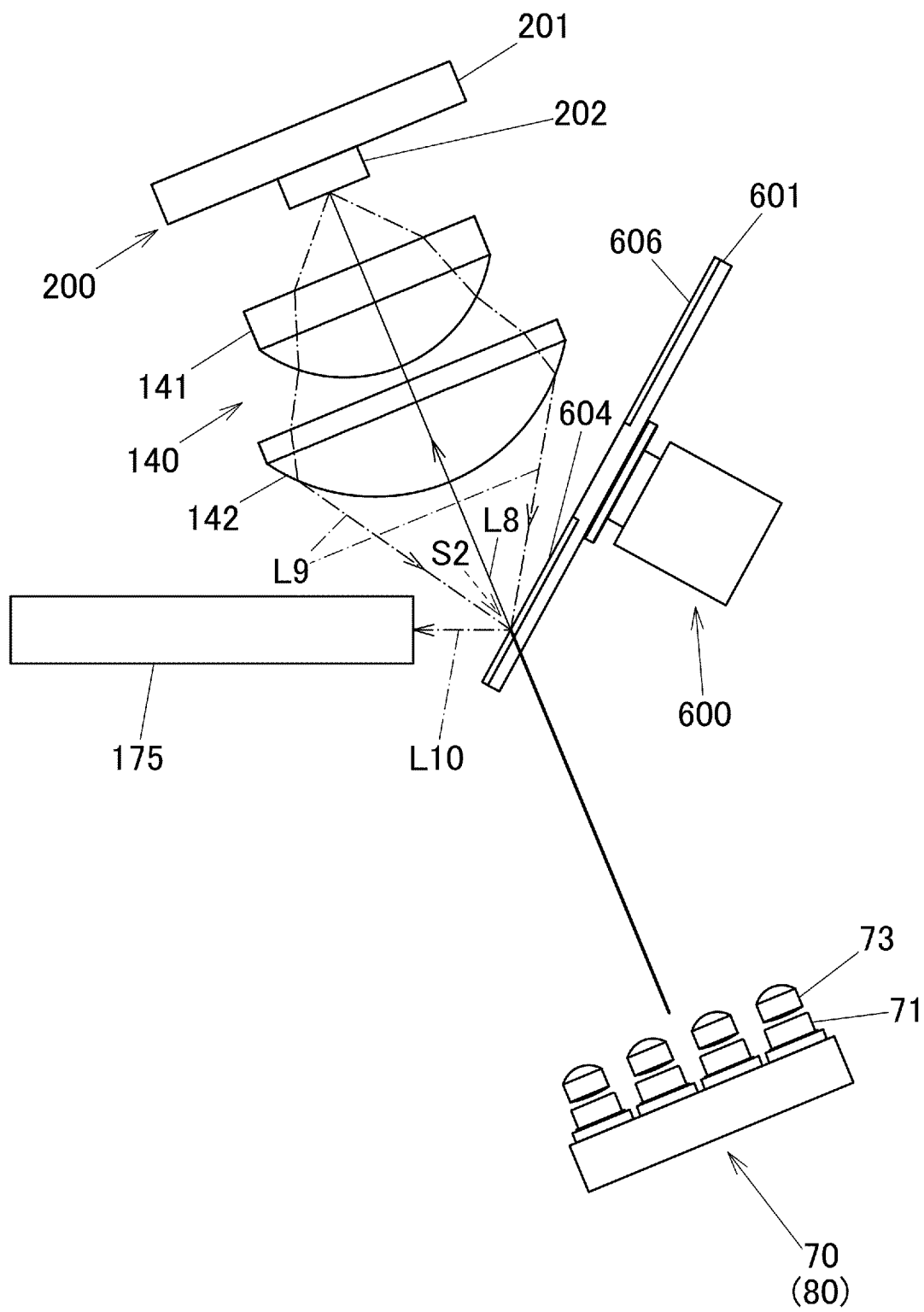
FIG. 16 is a schematic plan view showing how excitation light shined on the rotational wheel device according to the fourth embodiment passes through the rotational wheel device and is then shined on the luminescent light emission area of the luminescent light emission device to thereby emit luminescent light.

Next, referring to FIGS. 12 and 16, a fourth embodiment of the present disclosure will be described. In describing the fourth embodiment, like configurations to those of the first embodiment will be omitted from the description or will be described briefly. As shown in FIG. 12, a projector 10 according to the fourth embodiment includes a light source apparatus 560, which is disposed at a substantially central portion of a housing of the projector 10, a light source optical system 170, which is disposed on a left-hand side of the light source apparatus 560, and a projection optical system 220, which is disposed between the light source optical system 170 and a control circuit board 242.

The light source apparatus 560 includes an excitation light shining device 70, which is a light source of light in the blue wavelength range (light in a first wavelength range) and is also a light source of excitation light, a red-green light source device 80, which is a light source of light in the red wavelength range (light in a third wavelength range) and light in the green wavelength range (light in a fourth wavelength rage), a rotational wheel device 600, and a fixed luminescent body 200 (a luminescent light emission device). The excitation light shining device 70 is disposed in such a manner as to face a plate surface of a rotational wheel 601 possessed by the rotational wheel device 600, and the fixed luminescent body 200 (the luminescent light emission device) is disposed in such a manner as to face a plate surface of an opposite side to a side of the rotational wheel 601 which faces the excitation light shining device 70. The configuration and function of the excitation light shining device 70 are similar to those of the excitation light shining device 70 of the first embodiment. The red-green light source device 80 is made up of the excitation light shining device 70, the rotational wheel device 600, and the fixed luminescent body 200. Additionally, the light source apparatus 560 includes a light guiding optical system 140, which is configured not only to guide excitation light which passes through the rotational wheel device 600 towards the fixed luminescent body 200 but also to guide luminescent light emitted from the luminescent light emission area 202 towards the rotational wheel device 600, and a light source optical system 170, which is configured to guide light which passes through the rotational wheel device 600.

Figure 13A:
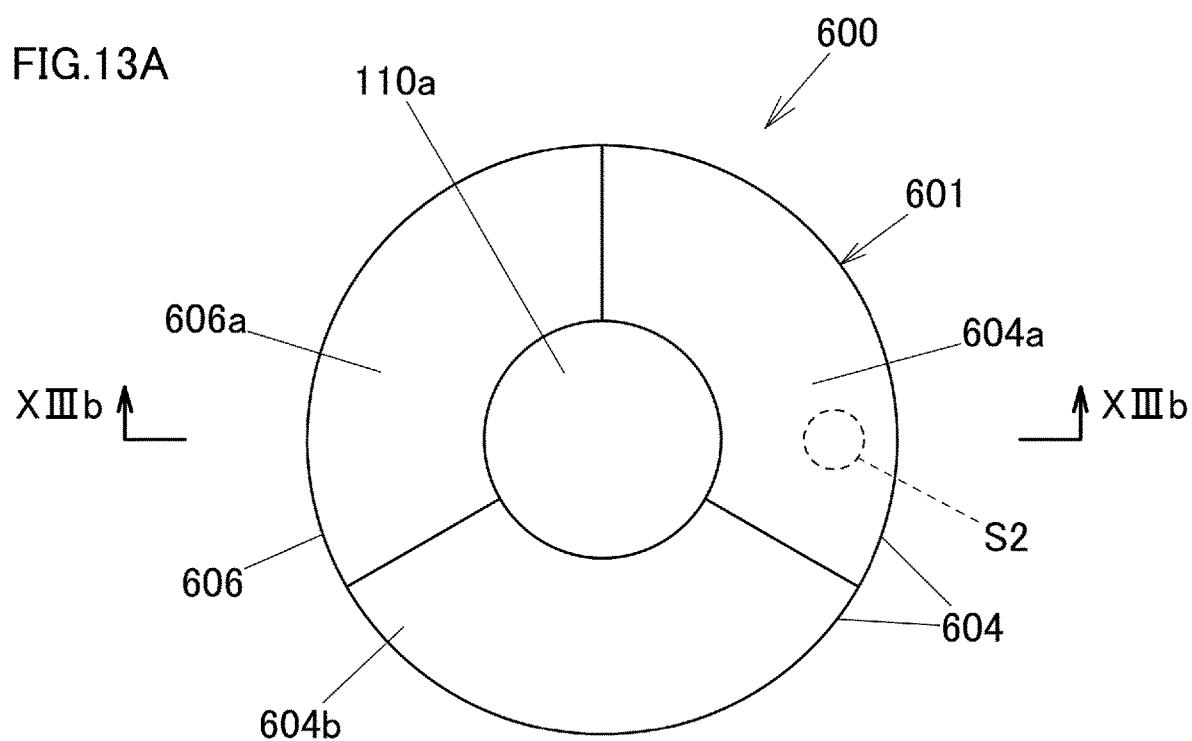
FIG. 13A is a schematic diagram showing a rotational wheel device according to the fourth embodiment, which is a schematic plan view of a rotational wheel.
Figure 13B:
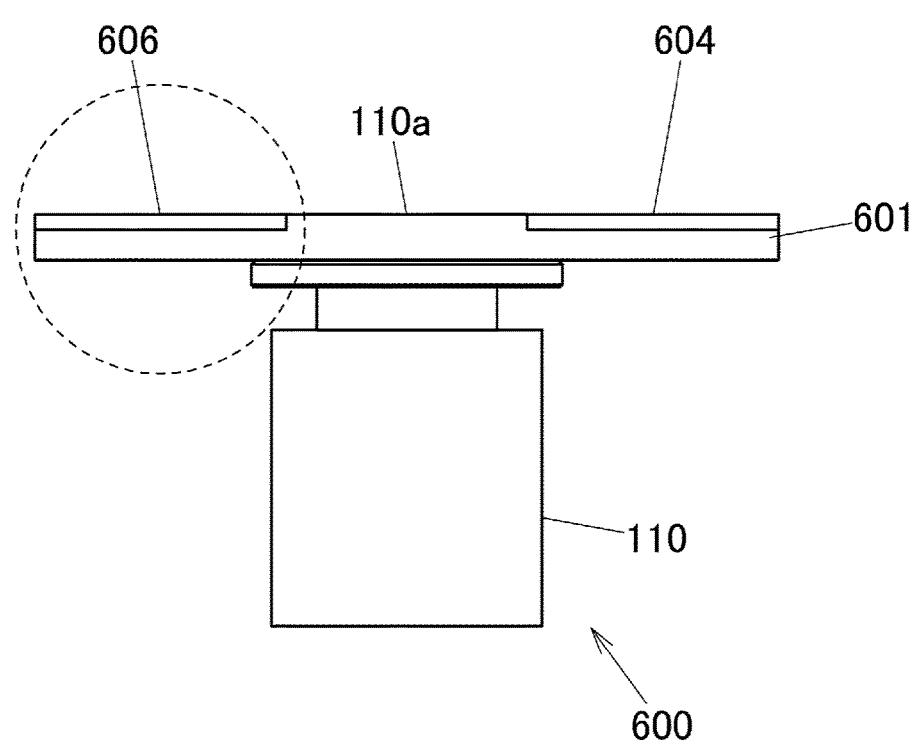
FIG. 13B is a schematic sectional view showing a section taken along a line XIIIb-XIIIb in FIG. 13A.

Next, the configuration of the rotational wheel 601 possessed by the rotational wheel device 600 will be described. The rotational wheel 601 is formed of a transparent material such as glass, resin, or the like which has transmissivity and constitutes a color wheel having a filter area 604 and a direction-changing transmission area 606. A configuration for driving to rotate the rotational wheel 601 is similar to that of the first embodiment (refer to FIG. 13B). The filter area 604 includes a first filter area 604a and a second filter area 604b on, of both plate surfaces of the rotational wheel 601, an opposite side (a front surface side) to a side thereof which faces the excitation light shining device 70. The direction-changing transmission area 606 is provided at a different area from the filter area 604 on, of both the plate surfaces of the rotational wheel 601, the opposite side (the front surface side) to the side thereof which faces the excitation light shining device 70. The first filter area 604a, the second filter area 604b, and the direction-changing transmission area 606 are provided end to end in a circumferential direction of the rotational wheel 601, and in a configuration shown in FIG. 13A, the areas are each disposed in such a manner as to extend circumferentially over an angular range of about 120 degrees. The portions on the front surface of the rotational wheel 601 which are occupied individually by the first filter area 604a, the second filter area 604b, and the direction-changing transmission area 606 are not limited to the angular range of about 120 degrees but may be changed as required.

The first filter area 604a and the second filter area 604b on the filter area 604 are each processed into a dichroic mirror, which is configured to reflect light in one wavelength range in a wavelength range of luminescent light emitted from a luminescent light emission area 202, which will be described later, and to transmit light in a predetermined wavelength range, which is made up of excitation light, and light in the other wavelength range in the wavelength range of the luminescent light. Specifically speaking, the first filter area 604a reflects light in the green wavelength range (light in the fourth wavelength range) and transmits light in the blue wavelength range (light in the first wavelength range) which is referred to as a wavelength range of excitation light and light in the red wavelength range (light in the third wavelength range). The second filter area 604b reflects light in the red wavelength range and transmits light in the blue wavelength range and light in the green wavelength range.

Figure 14A:
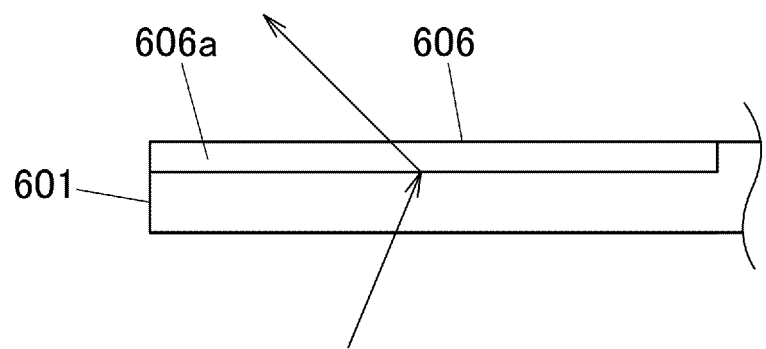
FIG. 14A is a schematic sectional view showing a portion of the rotational wheel device which is surrounded by a broken line in FIG. 13B in an enlarged fashion.

The direction-changing transmission area 606 transmits light in the blue wavelength range, which is referred to as the wavelength range of excitation light, while changing the direction thereof. Light in the blue wavelength range, which is incident on the direction-changing transmission area 606, is refracted so as to be guided towards a light tunnel 175, which will be described later. Specifically speaking, the direction of light in the blue wavelength range, which is incident on the direction-changing transmission area 606, is changed in such a manner that an axis of the light in the blue wavelength range is superposed on a light guiding direction of the light guiding optical system 170, which will be described later. In this fourth embodiment, as shown in FIG. 14A, a transmissive diffraction grating 606a (a diffraction grating), configured to diffract light in the blue wavelength range, is formed on the direction-changing transmission area 606. The transmissive diffraction grating 606a, which makes up a transmissive diffraction area 606a, can easily be formed by providing grooves in a plate surface of the rotational wheel 601. Light in the blue wavelength range, which is incident on the direction-changing transmission area 606, is guided along an optical path indicated by arrows shown in FIG. 14A as a result of the formation of the transmissive diffraction grating 606a. A diffuse characteristic may be given to the direction-changing transmission area 606 so as to diffuse light in the blue wavelength range as required.

Figure 14B:
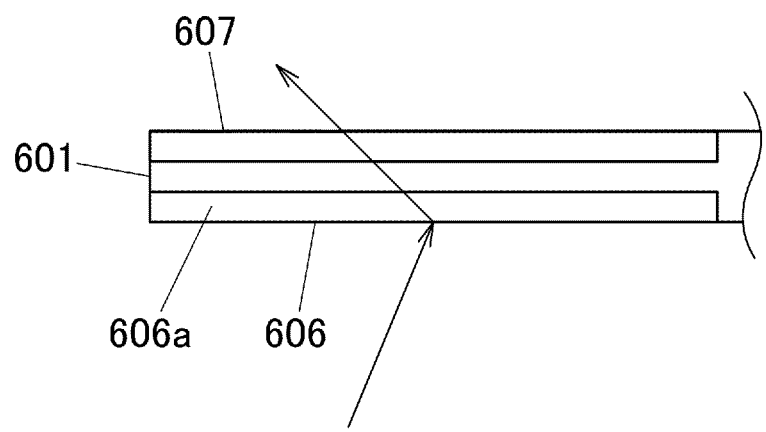
FIG. 14B is a schematic sectional view of a modified example of the portion shown in FIG. 14A.

In this fourth embodiment, although the configuration is described in which the direction-changing transmission area 606 is provided on the front surface side of the rotational wheel 601 and the transmissive diffraction grating 606a is formed on the direction-changing transmission area 606, a configuration may be adopted in which the direction-changing transmission area 606 is provided at an area which does not correspond in position to the filter area 604 on a rear surface of the rotational wheel 601, and a transmissive diffusion area 607, which is configured to transmit and diffuse light in the blue wavelength range which has passed through the direction-changing transmission area 606, is further provided at an area which corresponds in position to the direction-changing transmission area 606 on a front surface of the rotational wheel 601, as shown in FIG. 14B. In this case, light in the blue wavelength range, which is incident on the direction-changing transmission area 606, is guided along an optical path indicated by arrows shown in FIG. 14B. In a certain embodiment, the configurations shown in FIGS. 4B, 4C may be applied to the direction-changing transmission area 606. That is, multiple minute transmissive refraction members, which each have an inclined surface for refracting light in the blue wavelength range and which are disposed in a concentric circle-like fashion, may be formed at the direction-changing transmission area 606. Alternatively, one transmissive refraction member, which has an inclined surface for refracting light in the blue wavelength range, may be formed at the direction-changing transmission area 606. In another certain embodiment, the transmissive diffusion area 607 may not be provided in the configuration shown in FIG. 14B. For example, in the case that the quality of an image that is projected on a projection target object is good enough even though light in the blue wavelength range is not diffused by the rotational wheel 601, the transmissive diffusion area 107 may not be provided.

The rotational wheel device 600 is disposed so that an axis of light in the blue wavelength range, which has passed through the direction-changing transmission area 606 while its direction is changed in the direction-changing transmission area 606, and an axis of luminescent light which is reflected at the filter area 604 (the first filter area 604a or the second filter area 604b) are superposed on each other. That is, the rotational wheel device 600 has a function to combine light in the blue wavelength range which passes through the direction-changing transmission area 606 and light in the green wavelength range and light in the red wavelength range which are reflected at the filter area 604 together so that the blue, green, and red lights share the same light axis. Specifically speaking, the excitation light shining device 70, the rotational wheel device 600, and the fixed luminescent body 200 (the luminescent light emission device) are disposed so that the axis of light in the blue wavelength range that passes through the direction-changing transmission area 606 and the axis of luminescent light that is reflected at the filter area 604 are superposed on each other.

Luminescent light in the yellow wavelength range, which is emitted from the luminescent light emission area 202 to be incident on the filter area 604 of the rotational wheel device 600, is separated into light in a predetermined wavelength range which differs from the wavelength range of excitation light by the filter area 604. Specifically speaking, luminescent light in the yellow wavelength range includes light in the red wavelength range and light in the green wavelength range. The first filter area 604a transmits light in the red wavelength range to be removed and separates light in the green wavelength range to be reflected by the rotational wheel 601, and the second filter area 604b transmits light in the green wavelength range to be removed and separates light in the red wavelength range to be reflected by the rotational wheel 601.

Figure 15:
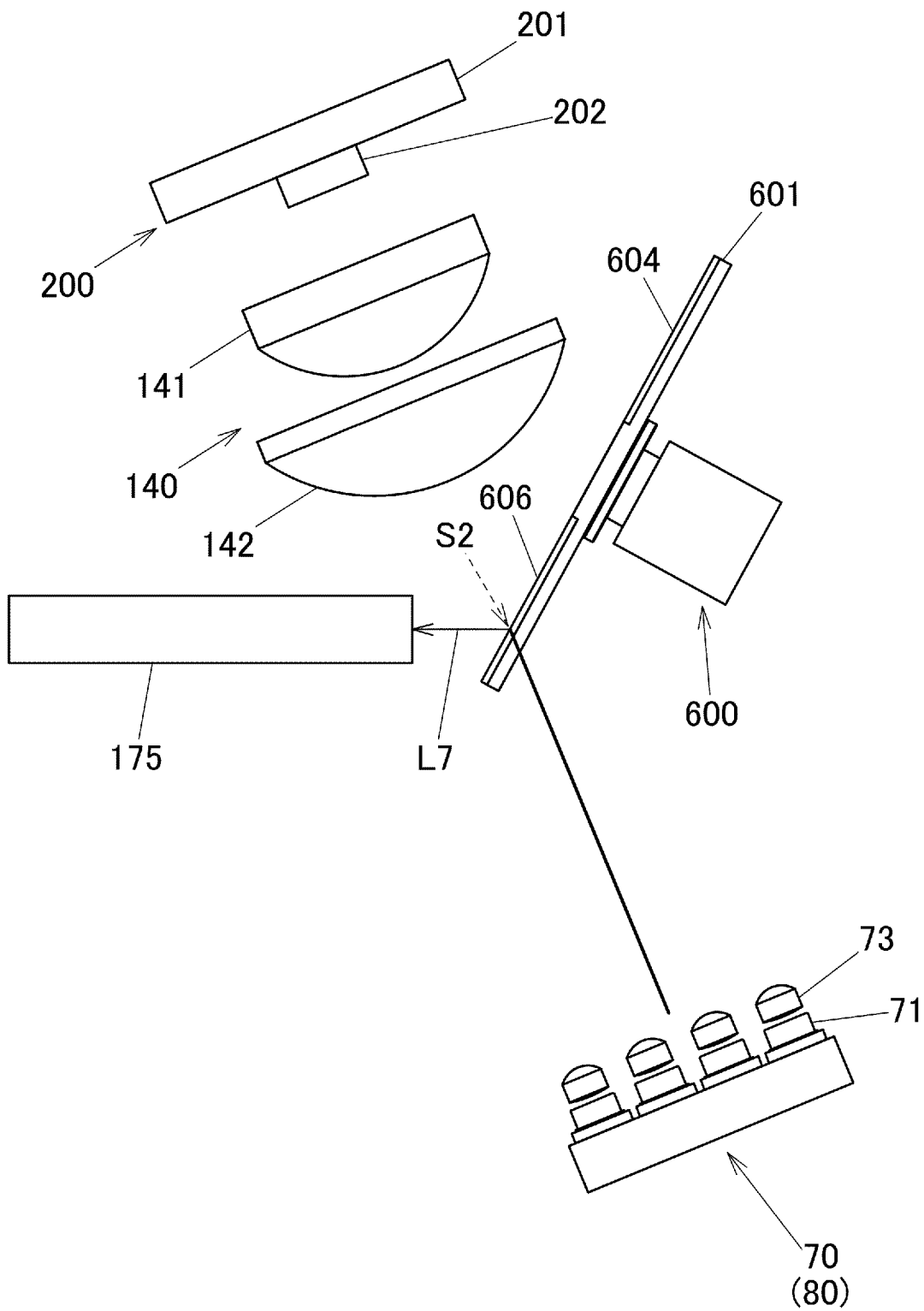
FIG. 15 is a schematic plan view showing how excitation light shined on the rotational wheel device according to the fourth embodiment passes through the rotational wheel device while the excitation light is being refracted or its direction is being changed.

Next, an entrance and exit of light into and from the rotational wheel device 600 will be described. Firstly, referring to FIG. 15, a case will be described in which light in the blue wavelength range, which is excitation light, exits from the rotational wheel device 600. Here, a position on the rotational wheel 601 where excitation light (light L7 indicated by a solid line in FIG. 15) is incident is referred to as a shining spot S2 (also refer to FIG. 13A). In FIG. 15, the direction-changing transmission area 606 of the rotational wheel 601 is positioned in the shining spot S2.

Excitation light emitted from the excitation light shining device 70 is obliquely incident on the rear surface of the rotational wheel 601. When the direction-changing transmission area 606 is positioned in the shining spot S2, the excitation light, which is obliquely incident on the rotational wheel 601, is incident on the direction-changing transmission area 606 of the rotational wheel 601. The excitation light, which is incident on the direction-changing transmission area 606, passes through the direction-changing transmission area 606 while its direction is being changed towards the light tunnel 175 by the direction-changing transmission area 606 and is emitted towards the light tunnel 175. In this way, excitation light, which is made up of light in the blue wavelength range, can be made use of as light source light. In the case that the transmissive diffusion area 607 is provided at the area which corresponds in position to the direction-changing transmission area 606 on the front surface of the rotational wheel 601, excitation light, which is obliquely incident on the rotational wheel 601, is bent to change its direction at the direction-changing transmission area 606, is then diffused at the transmissive diffusion area 607, and is eventually emitted towards the light tunnel 175.

Next, referring to FIG. 16, a case in which luminescent light in the green wavelength range is emitted from the rotational wheel device 600 and a case in which luminescent light in the red wavelength range is emitted from the rotational wheel device 600 will be described. In FIG. 16, the first filter area 640a or the second filter area 604b of the filter area 604 on the rotational wheel 601 is positioned in the shining spot S2.

Excitation light, which is emitted from the excitation light shining device 70 and is then obliquely incident on the plate surface (the rear surface) of the rotational wheel 601, is incident on the first filter area 604a or the second filter area 604b of the filter area 604 on the rotational wheel 601. The excitation light, which is incident on the filter area 604, passes through the filter area 604 without its direction being changed and is then emitted therefrom towards the light guiding optical system 140.

The excitation light (light L8 indicated by a solid line in FIG. 16), which is emitted towards the light guiding optical system 140, is incident on a second collective lens 142 from a front thereof and passes sequentially through the second collective lens 142 and a first collective lens 141 in that order to eventually irradiate the luminescent light emission area 202 of the fixed luminescent body 200. With the light source apparatus 560, since the excitation light shining device 70 is disposed in such a manner as to face a plane including the luminescent light emission area 202 of the fixed luminescent body 200 with the rotational wheel 601 interposed therebetween, the excitation light, which has passed through the filter area 604, can be sequentially incident on the second collective lens 142 and the first collective lens 141 from the front thereof. When the excitation light is shined on luminescent material particles on the luminescent light emission area 202, luminescent light in the yellow wavelength range (light L9 indicated by an alternate long and short dash line in FIG. 16) is emitted in every direction. Here, the light emitted from the luminescent light emission area 202 includes the luminescent light in the yellow wavelength range and residual excitation light, which is reflected by the base 201 as it is without being shined on the luminescent material particles. In the luminescent light and the residual excitation light which are emitted from the luminescent light emission area 202, excitation light and residual excitation light which are emitted towards the light source optical system 140 are collected by the first collective lens 141 and the second collective lens 142 and are then incident on the rotational wheel 601 from the front surface thereof.

In the case that the first filter area 604a is positioned in the shining spot S2 of the rotational wheel 601, in the luminescent light in the yellow wavelength range, luminescent light in the red wavelength range is transmitted through the first filter area 604a to thereby be removed, while luminescent light in the green wavelength range is reflected by the first filter area 604a. In addition, the residual excitation light, which is incident on the first filter area 604a, passes through the first filter area 604a to thereby be removed. Similarly, in the luminescent light in the yellow wavelength range, luminescent light in the green wavelength range is transmitted through the second filter area 604b to thereby be removed, while luminescent light in the red wavelength range is reflected by the second filter area 604b. The residual excitation light, which is incident on the second filter area 604b, passes through the second filter area 604b to thereby be removed. In this way, the light in the red wavelength range and the light in the green wavelength range (light L10 indicated by an alternate long and short dash line in FIG. 16) from which the residual excitation light is almost removed can be obtained.

The light in the red wavelength range and the light in the green wavelength range which are reflected at the filter area 604 are emitted towards the light tunnel 175. With the light source apparatus 560, since the rotational wheel 601 is disposed at the angle at which the rotational wheel 601 is inclined with respect to the plane including the luminescent light emission area 202 of the fixed luminescent body 200, the light in the red wavelength range and the light in the green wavelength range which are reflected at the filter area 604 can be guided towards the light tunnel 175. As this occurs, the optical paths of the light in the red wavelength range and the light in the green wavelength range which travel from the rotational wheel device 600 towards the light tunnel 175 coincide with the optical path of the excitation light which travels from the rotational wheel device 600 towards the light tunnel 175. That is, the rotational wheel device 600 is disposed in such a position at such an angle that the axis of the excitation light which has passed through the direction-changing transmission area 606 and the axes of the light in the red wavelength range and the light in the green wavelength range which are reflected at the filter area 604 are superposed on each other.

Thus, as has been described heretofore, with the light source apparatus 560 of this fourth embodiment, since the optical path of light in the blue wavelength range, which is excitation light, coincides with the optical paths of light in the red wavelength range and light in the green wavelength range which differ from excitation light, the number of components involved can be reduced when compared with the conventional light source apparatus in which the optical path of excitation light differs from the optical paths of lights in the wavelength ranges which differ from that of the excitation light, whereby the size of the light source apparatus can be reduced, while the efficiency thereof can be increased. Additionally, with the light source apparatus 560 of this fourth embodiment, the generation of color shading can be reduced which is caused by an inaccuracy attributed to configuration in which the optical path of excitation light is separated from the optical paths of lights in different wavelength ranges from that of the excitation light. Additionally, since the rotational wheel device 600 has the direction-changing transmission area 606 which is configured to transmit excitation light while changing the direction thereof, no member for changing the direction of excitation light is needed, thereby making it possible to reduce the size of the light source apparatus.

With the light source apparatus 560 according to this fourth embodiment, the excitation light shining device 70 is disposed on the opposite side to the side where the fixed luminescent body 200 is disposed with the rotational wheel 601 being interposed therebetween. As a result, since excitation light emitted from the excitation light shining device 70 can easily be incident on the light guiding optical system 140, the degree of freedom in disposing the excitation light shining device 70 can be enhanced, thereby making it possible to facilitate the light axis adjustment.

Fifth Embodiment

Figure 17:
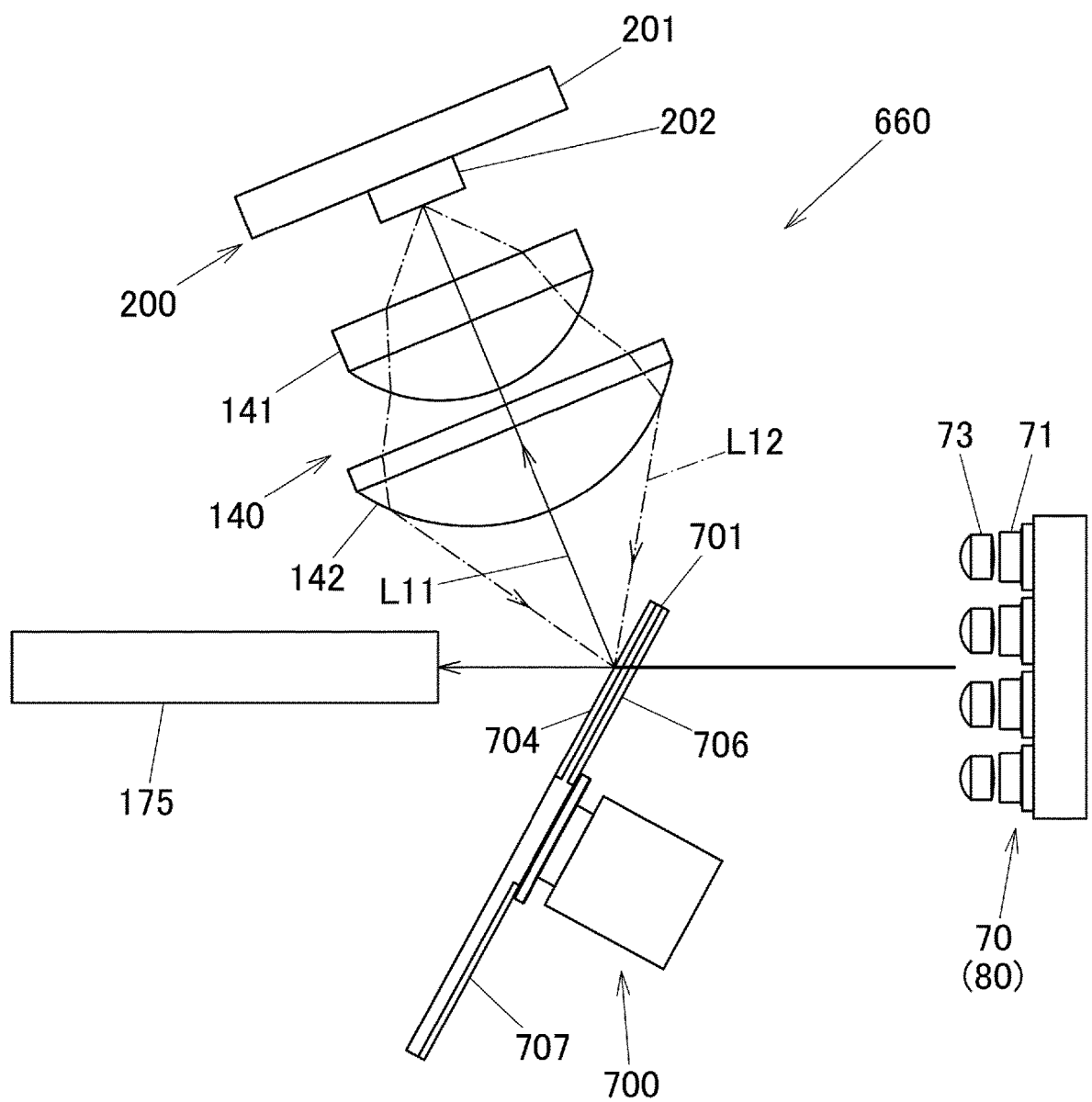
FIG. 17 is a schematic plan view showing how excitation light shined on a rotational wheel device according to a fifth embodiment passes through the rotational wheel device and how the excitation light shined on the rotational wheel device passes through the rotational wheel device and is then shined on the luminescent light emission area of the luminescent light emission device to thereby emit luminescent light.

Next, referring to FIG. 17, a fifth embodiment of the present disclosure will be described. In describing the fifth embodiment, like configurations to those of the fourth embodiment will be omitted from the description or will be described briefly. A light source apparatus 660 according to the fifth embodiment differs from that of the fourth embodiment in the disposition of an excitation light shining device 70, a fixed luminescent body 200, and a light guiding optical system 140 and the disposition and configuration of a rotational wheel device 700. As shown in FIG. 17, in the light source apparatus 660, the excitation light shining device 70 is disposed in such a manner as to face a light tunnel 175 so that the light tunnel 175 is positioned on an axis of excitation light emitted from the excitation light shining device 70.

A rotational wheel 701 of the rotational wheel device 700 is disposed at such an angle that the rotational wheel 701 is inclined with respect to a plane including a luminescent light emission area 202 of the fixed luminescent body 200 so that light emitted from the excitation light shining device 70 is obliquely incident on a plate surface (a rear surface) of the rotational wheel 701. The rotational wheel 701 includes a filter area 704 and a direction-changing transmission area 706 in the same or corresponding areas on plate surfaces thereof. That is, the rotational wheel 701 includes the filter area 704 on, of both the plate surfaces thereof, an opposite side (a front surface side) to a side which faces the excitation light shining device 70 and includes the direction-changing transmission area 706 in an area corresponding to the filter area 704 on the rear surface thereof. Additionally, the filter area 704 includes a first filter area and a second filter area which are provided end to end in a circumferential direction of the rotational wheel 701. The functions of the filter area 704, the direction-changing transmission area 706, the first filter area, and the second filter area are similar to those of the fourth embodiment.

An excitation light transmission area 707 is provided in a different area from the filter area 704 and the direction-changing transmission area 706 on the side (a rear surface side) which faces the excitation light shining device 70 of both the plate surfaces of the rotational wheel 701. The excitation light transmission area 707 transmits light in the blue wavelength range. A diffuse characteristic to diffuse light in the blue wavelength range may be given to this excitation light transmission area 707 as required. In a certain embodiment, the excitation light transmission area 707 is formed of a transparent material such as glass, resin, or the like which has transmissivity. Further, in another certain embodiment, the excitation light transmission area 707 may be provided on the front surface side of the rotational wheel 701 or may be provided on both the surfaces of the rotational wheel 701.

In a certain embodiment, as described in the first embodiment, a transmissive diffraction grating for diffracting light in the blue wavelength range may be formed on the direction-changing transmission area 706. Alternatively, multiple minute transmissive refraction members, which each have an inclined surface for refracting light in the blue wavelength range and which are disposed in a concentric circle-like fashion, may be formed on the direction-changing transmission area 706. Further, one transmission refraction member having an inclined surface for refracting light in the blue wavelength range may be formed in the direction-changing transmission area 706.

The rotational wheel device 700 is disposed so that an axis of light in the blue wavelength range which passes through the excitation light transmission area 707 and an axis of luminescent light which is reflected at the filter area 704 (the first filter area or the second filter area) are superposed on each other. That is, the rotational wheel device 700 has a function to combine excitation light which passes through excitation light transmission area 707 and light in the green wavelength range and light in the red wavelength range which are reflected at the filter area 704 together so that the lights share the same light axis.

Next, an entrance and exit of light into and from the rotational wheel device 700 of the fifth embodiment will be described. Firstly, a case will be described in which light in the blue wavelength range, which is excitation light, is emitted from the rotational wheel device 700. In this case, the excitation light transmission area 707 of the rotational wheel 701 is position at a shining spot on the rotational wheel 701 where excitation light is incident. Excitation light emitted from the excitation light shining device 70 is obliquely incident on the plate surface (the rear surface) of the rotational wheel 701. When the excitation light transmission area 707 is positioned at the shining spot, excitation light, which is obliquely incident on the rotational wheel 701, passes through the excitation light transmission area 707 without its direction being changed and is then emitted towards the light tunnel 175. In this way, light in the blue wavelength range, which functions as excitation light, can be made use of as light source light.

Next, a case in which luminescent light in the green wavelength range is emitted from the rotational wheel device 700 and a case in which luminescent light in the red wavelength range is emitted from the rotational wheel device 700 will be described. In these cases, on the rotational wheel 701, the filter area 704 is positioned at the shining spot on the front surface side, while the direction-changing transmission area 706 is positioned at the shining spot on the rear surface side. Excitation light, which is emitted from the excitation light shining device 70 and is then obliquely incident on the plate surface (the rear surface) of the rotational wheel 701, is incident on the direction-changing transmission area 706 on the rotational wheel 701. The excitation light, which is incident on the direction-changing transmission area 706, passes through the direction-changing transmission area 706 and the filter area 704 while its direction is being changed towards the light guiding optical system 140 by the direction-changing transmission area 706 and is then emitted towards the light guiding optical system 140.

The excitation light (light L11 indicated by a solid line in FIG. 17), which is emitted towards the light guiding optical system 140, is incident on a second collective lens 142 from a front surface thereof, passes sequentially through the second collective lens 142 and a first collective lens 141 in that order, and irradiates a luminescent light emission area 202 of the fixed luminescent body 200. When the excitation light is shined on luminescent material particles on the luminescent light emission area 202, luminescent light in the yellow wavelength range (light L12 indicated by an alternate long and short dash line in FIG. 17) is emitted in every direction. In the luminescent light and residual excitation light which are emitted from the luminescent light emission area 202, luminescent light and residual excitation light which are emitted towards the light guiding optical system 140 are collected by the first collective lens 141 and the second collective lens 142 and are then incident on the rotational wheel 701 from the front surface thereof.

In the case that the first filter area is positioned at the shining spot on the rotational wheel 701, luminescent light in the green wavelength range is reflected at the first filter area, whereas in the case that the second filter area is positioned at the shining spot, luminescent light in the red wavelength range is reflected at the second filter area. The light in the red wavelength range and the light in the green wavelength range which are reflected at the filter area 704 are then emitted towards the light tunnel 175. As this occurs, the optical paths of the light in the red wavelength range and the light in the green wavelength range which travel from the rotational wheel device 700 towards the light tunnel 175 coincide with the optical path of the excitation light travelling from the rotational wheel device 700 towards the light tunnel 175.

With the light source apparatus 660 according to this fifth embodiment that has been described heretofore, the rotational wheel 701 includes the filter area 704, which is provided at the area corresponding in position to the direction-changing transmission area 706 on the surface of the opposite side and is configured to reflect luminescent light in the green wavelength range and luminescent light in the red wavelength range but to transmit excitation light and the excitation light transmission area 707, which is provided at the area which differs from the direction-changing transmission area 706 and is configured to transmit excitation light. Then, the rotational wheel device 700 is disposed so that the axis of the excitation light which passes through the excitation light transmission area 707 and the axes of the luminescent light in the green wavelength range and the luminescent light in the red wavelength range which are reflected at the filter area 704 are superposed on each other. As a result, similar to the fourth embodiment, the number of components involved can be reduced when compared with the conventional light source apparatus, whereby the size and efficiency of the light source apparatus 660 can be reduced and increased, respectively. In addition, the generation of color shading can be reduced which is caused by an inaccuracy attributed to the configuration in which the optical path of excitation light is separated from the optical paths of lights in different wavelength ranges from that of the excitation light.

Additionally, with the light source apparatus 660 according to the fifth embodiment, excitation light emitted from the excitation light shining device 70 is shined on the luminescent light emission area 202 of the fixed luminescent body 200 by changing its direction by the direction-changing transmission area 706 on the rotational wheel 701. As a result, excitation light can easily be shined on the fixed luminescent body 200.

Sixth Embodiment

Figure 18:
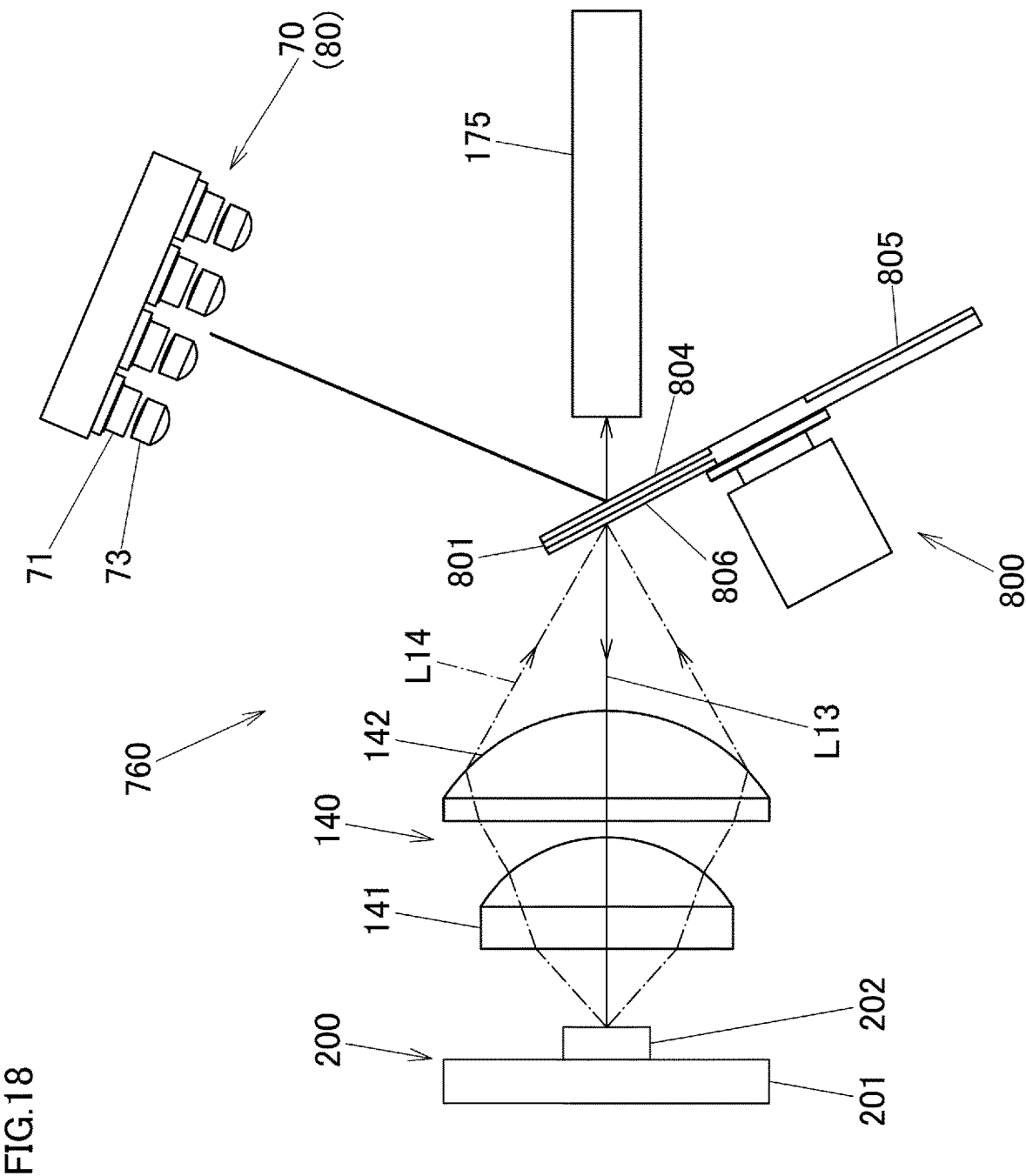
FIG. 18 is a schematic plan view showing how excitation light shined on a rotational wheel device according to a sixth embodiment reflects at the rotational wheel device and how the excitation light shined on the rotational wheel device passes through the rotational wheel device and is then shined on the luminescent light emission area of the luminescent light emission device to thereby emit luminescent light.

Next, referring to FIGS. 18 and 19, a sixth embodiment of the present disclosure will be described. In describing the sixth embodiment, like configurations to those of the fourth embodiment will be omitted from the description or will be described briefly. A light source apparatus 760 according to the sixth embodiment differs from that of the fourth embodiment in the disposition of an excitation light shining device 70, a fixed luminescent body 200, and a light guiding optical system 140 and the disposition and configuration of a rotational wheel device 800. In the light source apparatus 760 according to the sixth embodiment, the fixed luminescent body 200 is disposed in such a manner as to face a light tunnel 175 with the rotational wheel device 800 interposed therebetween.

Figure 19A:
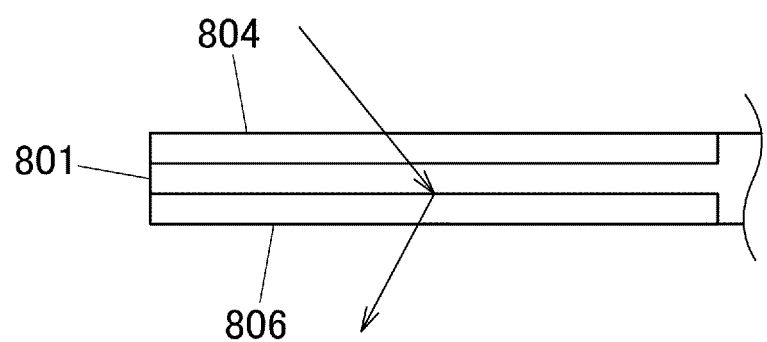
FIG. 19A is a schematic sectional view showing a portion of the rotational wheel device according to the sixth embodiment in an enlarged fashion.

A rotational wheel 801 of the rotational wheel device 800 is disposed at such an angle that the rotational wheel 801 is inclined with respect to a plane including a luminescent light emission area 202 of the fixed luminescent body 200 so that light emitted from the excitation light shining device 70 is obliquely incident on a plate surface (a front surface) of the rotational wheel 801. As shown in FIG. 19A, the rotational wheel 801 includes a filter area 804 and a direction-changing transmission area 806 in the same or corresponding areas on plate surfaces thereof. That is, the rotational wheel 801 includes the filter area 804 on, of both the plate surfaces thereof, a side (a front surface side) which faces the excitation light shining device 70 and includes the direction-changing transmission area 806 in an area corresponding to the filter area 804 on rear surface thereof. Additionally, the filter area 804 includes a first filter area and a second filter area which are provided end to end in a circumferential direction of the rotational wheel 801. Upon being incident on the filter area 804 from a front surface of the rotational wheel 801, light in the blue wavelength range passes through the filter area 804 and then passes through the direction-changing transmission area 806 while its direction is being changed by the direction-changing transmission area 806.

The sixth embodiment differs from the fourth embodiment and the fifth embodiment in the function of the direction-changing transmission area 806 and the functions of the first filter area and the second filter area of the filter area 804. That is, the direction-changing transmission area 806 transmits light in the green wavelength range and light in the red wavelength range in addition to light in the blue wavelength range. A volume hologram or a diffraction grating having a laminated structure is raised as an example of the direction-changing transmission area 806. The first filter area transmits light in the green wavelength range and light in the blue wavelength range and reflects light in the red wavelength range. The second filter area transmits light in the red wavelength range and light in the blue wavelength range and reflects light in the green wavelength range.

Figure 19B:
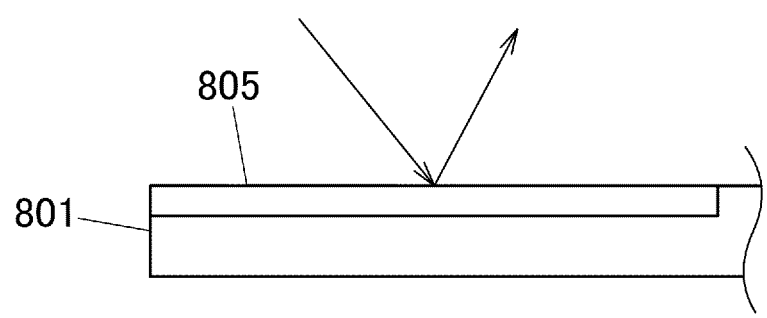
FIG. 19B is a schematic sectional view showing another portion of the rotational wheel device according to the sixth embodiment in an enlarged fashion.

As shown in FIG. 19B, an excitation light reflection area 805 is provided in a different area from the filter area 804 and the direction-changing transmission area 806 on, of both the plate surfaces of the rotational wheel 801, the side (the front surface side) which faces the excitation light shining device 70. The excitation light reflection area 805 reflects light in the blue wavelength range, which is excitation light. A diffuse characteristic to diffuse light in the blue wavelength range may be given to the excitation light reflection area 805 as required. Light in the blue wavelength range, which is incident on the excitation light reflection area 805 from a front surface of the rotational wheel 801, is reflected on the excitation light reflection area 805 as indicated by an arrow in FIG. 19B.

The rotational wheel device 800 is disposed so that an axis of light in the blue wavelength range which is reflected at the excitation light reflection area 805 and an axis of luminescent light which passes through the filter area 804 (the first filter area or the second filter area) are superposed on each other. That is, the rotational wheel device 800 has a function to combine light in the blue wavelength range which is reflected at the excitation light reflection area 805 with light in the green wavelength range and light in the red wavelength range which pass through the filter area 804 in such a manner that the lights share the same light axis. Specifically speaking, the excitation light shining device 70, the rotational wheel device 800, and the fixed luminescent body 200 (a luminescent light emission device) are disposed so that the axis of light in the blue wavelength range which is reflected at the excitation light reflection area 805 and the axes of luminescent lights which pass through the filter area 804 are superposed on each other.

Next, an entrance and exit of light into and from the rotational wheel device 800 of the sixth embodiment will be described. Firstly, a case will be described in which light in the blue wavelength range, which is excitation light, is emitted from the rotational wheel device 800. In this case, the excitation light reflection area 805 of the rotational wheel 101 is positioned at a shining spot on the rotational wheel 801. Excitation light emitted from a collimator lens 73 of the excitation light shining device 70 is obliquely incident on a front surface of the rotational wheel 801. When the excitation light reflection area 805 is positioned at the shining spot, the excitation light, which is obliquely incident on the rotational wheel 801, is incident on the excitation light reflection area 805 of the rotational wheel 801. The excitation light, which is incident on the excitation light reflection area 805, is then reflected towards the light tunnel 175 by the excitation light reflection area 805. In this way, excitation light, which is light in the blue wavelength range, can be made use of as light source light.

Next, a case in which luminescent light in the green wavelength range is emitted from the rotational wheel device 800 and a case in which luminescent light in the red wavelength range is emitted from the rotational wheel device 800 will be described. In these cases, the filter area 804 is positioned at the shining spot on the front surface side, and the direction-changing transmission area 806 is positioned at the shining spot on the rear surface side. Excitation light, which is emitted from the excitation light shining device 70 and which is then obliquely incident on a plate surface (a front surface) of the rotational wheel 801, is incident on the filter area 804 of the rotational wheel 801. Upon being incident on the filter area 804, the excitation light passes through the filter area 804, passes through the direction-changing transmission area 806 while its direction is being changed by the direction-changing transmission area 806, and is eventually emitted towards the light guiding optical system 140.

The excitation light (light L13 indicated by a solid line in FIG. 18), which is emitted towards the light guiding optical system 140, is incident on a second collective lens 142 from a front surface thereof, passes sequentially through the second collective lens 142 and a first collective lens 141 in that order, and irradiates a luminescent light emission area 202 of the fixed luminescent body 200. When the excitation light is shined on luminescent material particles on the luminescent light emission area 202, luminescent light in the yellow wavelength range (light L14 indicated by an alternate long and short dash line in FIG. 18) is emitted in every direction. In the luminescent light and residual excitation light which are emitted from the luminescent light emission area 202, luminescent light and residual excitation light which are emitted towards the light guiding optical system 140 are collected by the first collective lens 141 and the second collective lens 142 and are then incident on the rotational wheel 801 from a rear surface thereof.

The luminescent light and the residual excitation light, which are incident on the rotational wheel 801 from the rear surface thereof, pass through the direction-changing transmission area 806, and are incident on the first filter area or the second filter area. In the case that the first filter area is positioned at the shining spot on the rotational wheel 801, luminescent light in the green wavelength range passes through the first filter area, whereas in the case that the second filter area is positioned at the shining spot, luminescent light in the red wavelength range passes through the second filter area. The light in the red wavelength range and the light in the green wavelength range which have passed through the filter area 804 are then emitted towards the light tunnel 175. As this occurs, the optical paths of the light in the red wavelength range and the light in the green wavelength range which travel from the rotational wheel device 800 towards the light tunnel 175 coincide with the optical path of the excitation light which travels from the rotation wheel device 800 towards the light tunnel 175.

With the light source apparatus 760 according to the sixth embodiment, the direction-changing transmission area 806 transmits luminescent light in the green wavelength range and luminescent light in the red wavelength range, the rotational wheel 801 includes the filter area 804, which is provided in the area corresponding to the direction-changing transmission area 806 on the surface of the opposite side and is configured to transmit luminescent light in the green wavelength range or luminescent light in the red wavelength range and to transmit excitation light, and the excitation light reflection area 805, which is provided in the different area from the direction-changing transmission area 806 and is configured to reflect excitation light, and the rotational wheel device 800 is disposed so that the axis of excitation light which is reflected at the excitation light reflection area 805 and the axes of the luminescent lights in the predetermined wavelength ranges which pass through the filter area 804 are superposed on each other. As a result, similar to the fourth embodiment, the number of components involved can be reduced when compared with the conventional light source apparatus, whereby the size and efficiency of the light source apparatus 760 can be reduced and increased, respectively. In addition, the generation of color shading can be reduced which is caused by an inaccuracy attributed to the configuration in which the optical path of excitation light is separated from the optical paths of lights in different wavelength ranges from that of the excitation light. In a certain embodiment, the direction-changing transmission area 806 may be provided on the plate surface of the rotational wheel 801 on the side which faces the excitation light shining device 70, and the filter area 804 may be provided on the plate surface of the rotational wheel 801 on the side which faces the fixed luminescent body 200. In another certain embodiment, and also in the fourth embodiment to the sixth embodiment, a light guiding rod may be used in place of the light tunnel 175. Alternatively, the microlens array 90, which is described by reference to FIG. 5, may be disposed in place of the light tunnel 175, and a concave lens 181 may be disposed in place of the third collective lens 178.

In a certain embodiment, and also in the fourth embodiment to the sixth embodiment, the luminescent wheel 400 according to the third embodiment may be used in place of the fixed luminescent body 200. In another certain embodiment, and also in the fourth embodiment to the sixth embodiment, a configuration corresponding to the rotational wheel 501, which is described by reference to FIGS. 10 and 11, may be adopted. Specifically speaking, in the fourth embodiment and the fifth embodiment, the filter areas 604, 704 may each have a third filter area configured to reflect light in the yellow wavelength range and to transmit light in the blue wavelength range, light in the green wavelength range, and light in the red wavelength range on the surface of the same side as the side where the first filter area 604*a* and the second filter area 604*b* are provided. In the sixth embodiment, the filter area 804 may have a third filter area, similar to the third filter area 504*c*, which is configured to transmit light in the yellow wavelength range and to reflect light in the blue wavelength range, light in the green wavelength range, and light in the red wavelength range on the surface of the same side as the side where the first filter area and the second filter area are provided.

The embodiments described heretofore are presented as examples, and hence, there is no intention to limit the scope of the present invention by the embodiments. These novel embodiments can be carried out in other various forms, and various omissions, replacements and modifications can be made thereto without departing from the spirit and scope of the present invention. Those resulting embodiments and their modifications are included in the scope and gist of the present invention and are also included in the scope of inventions claimed for patent under claims below and their equivalents.

What is claimed is:

1. A light source apparatus comprising:
an excitation light shining device configured to emit excitation light;
a rotational wheel device comprising a rotational wheel including a filter area configured to transmit light in a predetermined wavelength range which differs from a wavelength range of the excitation light and reflect the excitation light and a direction-changing transmission area configured to transmit the excitation light while changing a direction of the excitation light; and
a luminescent light emission device configured to receive the excitation light reflected on the filter area to thereby emit luminescent light including the light in the predetermined wavelength range towards the filter area,
wherein the rotational wheel device is disposed so as to cause an axis of the excitation light which passes through the direction-changing transmission area and an axis of the luminescent light in the predetermined wavelength range which passes through the filter area to be superposed on each other.

2. The light source apparatus according to claim 1, comprising:
a light guiding member configured to guide the excitation light reflected at the filter area to the luminescent light emission device.

3. The light source apparatus according to claim 1, wherein the rotational wheel includes a transmissive diffusion area configured to transmit the excitation light which has passed through the direction-changing transmission area while diffusing the excitation light, the transmissive diffusion area being provided in an area corresponding to the direction-changing transmission area on a surface on an opposite side.

4. The light source apparatus according to claim 3, wherein the rotational wheel is disposed at an angle at which the rotational wheel is inclined with respect to a plane including a luminescent light emission area of the luminescent light emission device.

5. The light source apparatus according to claim 4, wherein the rotational wheel comprises an excitation light reflection area configured to transmit light in a wavelength range other than the wavelength range of the excitation light and to reflect the excitation light, the excitation light reflection area being provided in an area corresponding to the filter area on a surface of an opposite side.

6. The light source apparatus according to claim 3, wherein the rotational wheel comprises a direction-changing reflection area configured to reflect the excitation light which is obliquely incident on the rotational wheel in a normal direction of the rotational wheel, the direction-changing reflection area being provided in an area corresponding to the filter area on a surface of an opposite side.

7. The light source apparatus according to claim 6, wherein the rotational wheel is disposed at an angle at which the rotational wheel becomes parallel to a plane including a luminescent light emission area of the luminescent light emission device.

8. The light source apparatus according to claim 3, wherein a refraction member having an inclined surface configured to refract the excitation light is formed on the direction-changing transmission area.

9. The light source apparatus according to claim 1, wherein the rotational wheel is disposed at an angle at which the rotational wheel is inclined with respect to a plane including a luminescent light emission area of the luminescent light emission device.

10. The light source apparatus according to claim 9, wherein the rotational wheel comprises an excitation light reflection area configured to transmit light in a wavelength range other than the wavelength range of the excitation light and to reflect the excitation light, the excitation light reflection area being provided in an area corresponding to the filter area on a surface of an opposite side.

11. The light source apparatus according to claim 1, wherein the rotational wheel comprises a direction-changing reflection area configured to reflect the excitation light which is obliquely incident on the rotational wheel in a normal direction of the rotational wheel, the direction-changing reflection area being provided in an area corresponding to the filter area on a surface of an opposite side.

12. The light source apparatus according to claim 11, wherein the rotational wheel is disposed at an angle at which the rotational wheel becomes parallel to a plane including a luminescent light emission area of the luminescent light emission device.

13. The light source apparatus according to claim 11, wherein a reflective diffraction grating configured to diffract the excitation light while reflecting the excitation light in a normal direction of a plate surface of the rotational wheel is formed on the direction-changing reflection area.

14. The light source apparatus according to claim 11, wherein a reflective refraction member having an inclined surface configured to reflect the excitation light at a predetermined angle is formed on the direction-changing reflection area.

15. The light source apparatus according to claim 1, wherein a diffraction grating configured to diffract the excitation light is formed on the direction-changing transmission area.

16. The light source apparatus according to claim 1, wherein a refraction member having an inclined surface configured to refract the excitation light is formed on the direction-changing transmission area.

17. The light source apparatus according to claim 1, comprising:
a light tunnel or a light guiding rod configured to guide light which has passed through the rotational wheel device.

18. The light source apparatus according to claim 1, comprising:
a microlens array configured to guide light which has passed through the rotational wheel device.

19. The light source apparatus according to claim 1, wherein the luminescent light emission device is a luminescent wheel device.

20. A projector comprising:
the light source apparatus according to claim 1;
a display device configured to generate image light;
a projection optical system configured to project the image light emitted from the display device on to a projection target object; and
a processor configured to control the light source apparatus and the display device.

* * * * *